(12) United States Patent
Li et al.

(10) Patent No.: US 12,273,958 B2
(45) Date of Patent: *Apr. 8, 2025

(54) SIM MODULE MANAGEMENT METHOD AND ELECTRONIC DEVICE

(71) Applicant: Huawei Technologies Co., Ltd., Shenzhen (CN)

(72) Inventors: Tao Li, Beijing (CN); Zezhi Wang, Beijing (CN); Chunlin Li, Beijing (CN); Xiao Han, Shenzhen (CN); Xin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

This patent is subject to a terminal disclaimer.

(21) Appl. No.: 17/639,191

(22) PCT Filed: Aug. 13, 2020

(86) PCT No.: PCT/CN2020/109007
§ 371 (c)(1),
(2) Date: Feb. 28, 2022

(87) PCT Pub. No.: WO2021/036809
PCT Pub. Date: Mar. 4, 2021

(65) Prior Publication Data
US 2022/0330007 A1    Oct. 13, 2022

(30) Foreign Application Priority Data

Aug. 30, 2019   (CN) .................. 201910816798.X

(51) Int. Cl.
*H04W 8/18*   (2009.01)
*H04W 8/20*   (2009.01)
(Continued)

(52) U.S. Cl.
CPC ........... *H04W 8/183* (2013.01); *H04W 8/205* (2013.01); *H04W 8/24* (2013.01); *H04W 88/06* (2013.01)

(58) Field of Classification Search
CPC ....... H04W 8/183; H04W 8/205; H04W 8/24; H04W 88/06
See application file for complete search history.

(56) References Cited

U.S. PATENT DOCUMENTS

2012/0135715 A1* 5/2012 Kang .................. H04W 4/16
455/418
2018/0109942 A1   4/2018 Lipovkov
(Continued)

FOREIGN PATENT DOCUMENTS

| CN | 101184293 A | 5/2008 |
|---|---|---|
| CN | 103298161 A | 9/2013 |

(Continued)

*Primary Examiner* — Angelica Perez
(74) *Attorney, Agent, or Firm* — Leydig, Voit & Mayer, Ltd.

(57) ABSTRACT

Embodiments of this application provide a SIM module management method and an electronic device, and relate to the field of electronic devices. A solution that supports an eSIM module is provided for an existing electronic device that supports dual SIM modules, so that the dual SIM modules are compatible with the eSIM module. The electronic device in the embodiments of this application may support three SIM modules. The three SIM modules include at least one eSIM module. The remaining two SIM modules may be both plug-in SIM modules, or may be one plug-in SIM module and one softSIM module. A user can arbitrarily select two SIM modules from the three SIM modules to be in online standby mode, or can arbitrarily select one SIM module from the three SIM modules to be in online standby mode.

32 Claims, 22 Drawing Sheets

(51) Int. Cl.
*H04W 8/24* (2009.01)
*H04W 88/06* (2009.01)

(56) References Cited

U.S. PATENT DOCUMENTS

| | | | | |
|---|---|---|---|---|
| 2018/0302781 | A1* | 10/2018 | Lee | ............... H04W 12/069 |
| 2019/0098487 | A1* | 3/2019 | Boettger | ............ H04W 8/183 |
| 2019/0230496 | A1 | 7/2019 | Wane | |
| 2023/0188172 | A1* | 6/2023 | Han | ............... H04B 1/3818 |
| | | | | 455/558 |

FOREIGN PATENT DOCUMENTS

| | | |
|---|---|---|
| CN | 104066210 A | 9/2014 |
| CN | 106465464 A | 2/2017 |
| CN | 106488439 A | 3/2017 |
| CN | 106535158 A | 3/2017 |
| CN | 106658464 A | 5/2017 |
| CN | 106658470 A | 5/2017 |
| CN | 106817257 A | 6/2017 |
| CN | 109587676 A | 4/2019 |
| CN | 109788494 A | 5/2019 |
| CN | 109983706 A | 7/2019 |
| CN | 110621013 A | 12/2019 |
| EP | 3337204 A1 | 6/2018 |
| EP | 2438794 B1 | 4/2019 |
| WO | WO 2013061275 A1 * | 5/2012 |
| WO | 2019164212 A1 | 8/2019 |

* cited by examiner

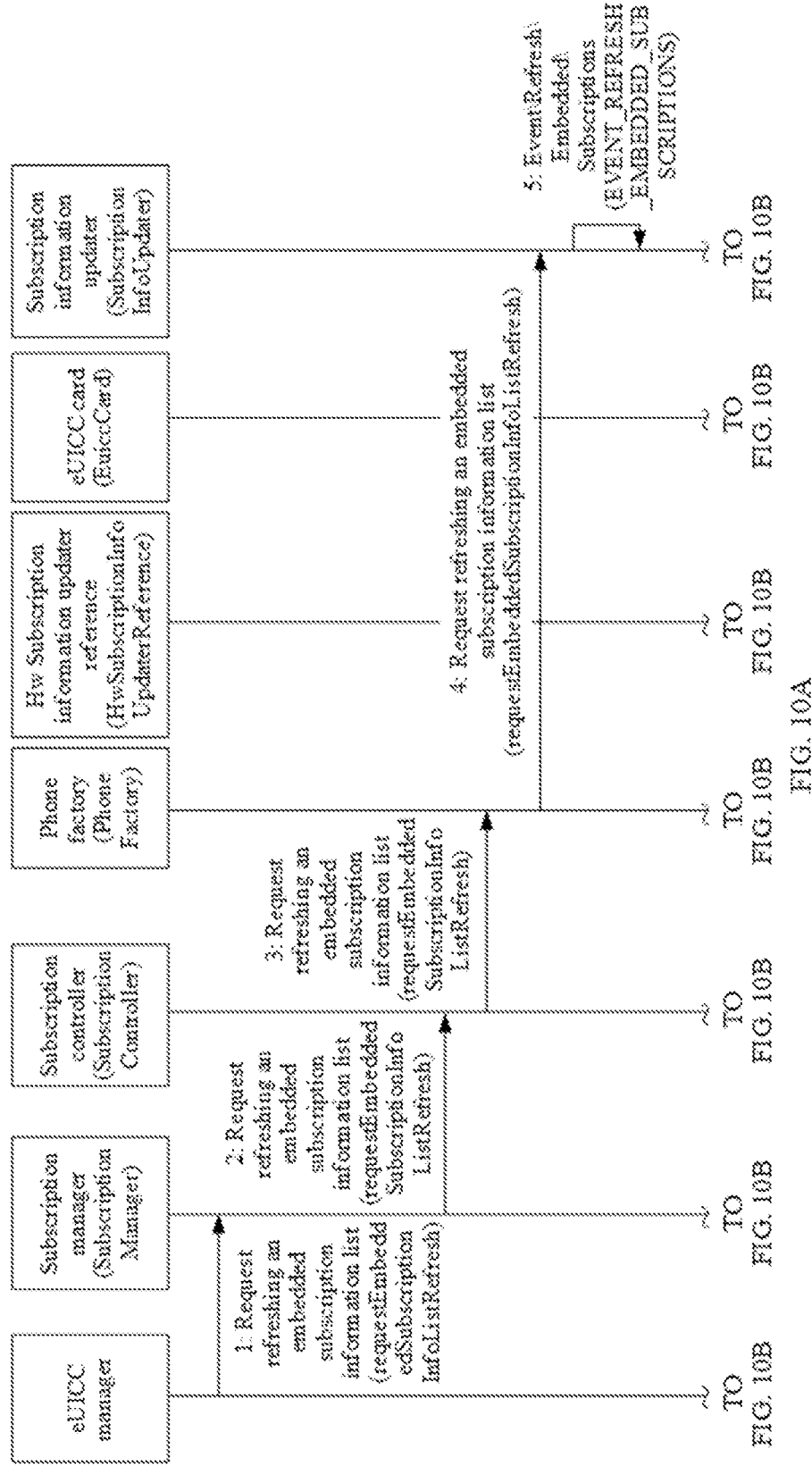

SIM MODULE MANAGEMENT METHOD AND ELECTRONIC DEVICE

This application is a National Stage of International Application No. PCT/CN2020/109007, filed on Aug. 13, 2020, which claims priority to Chinese Patent Application No. 201910816798.X, filed on Aug. 30, 2019, the entireties of which are incorporated herein by reference.

TECHNICAL FIELD

This application relates to the field of electronic devices, and in particular, to a subscriber identity module (subscriber identity module, SIM) management method and an electronic device.

BACKGROUND

With continuous progress of science and technologies, electronic devices such as mobile phones have become first-choice tools for communication in people's daily life and work. When the electronic device accesses a cellular mobile network, a SIM module needs to be used to implement authentication. Currently, for a conventional SIM module, a user needs to apply for and activate the SIM module at a customer service center of a carrier, or select a number at an online customer service center of the carrier to access a network. Then, the carrier sends the SIM module to the user through express delivery. After receiving the SIM module, the user completes the activation. The activated SIM module can be used only after being inserted into a physical card slot of the electronic device. Consequently, timeliness and experience are not very good. In view of this, an embedded-SIM (embedded-SIM, eSIM) technology emerges. The eSIM technology embeds a universal integrated circuit card into an electronic device, which is referred to as an embedded universal integrated circuit card (embedded universal integrated circuit card, eUICC). The eUICC may store a plurality of types of eSIM profiles of the carrier, and each type of eSIM profile may independently form a SIM application. The SIM application may be referred to as an eSIM module.

As is known to all, the mobile phone currently uses the conventional SIM module. At an early stage of development of the eSIM technology, a relatively small quantity of mobile phones support only the eSIM module. Therefore, compatibility between the eSIM module and the conventional SIM module on the mobile phone needs to be considered, so that the user and the carrier can gradually transition from the conventional SIM module to the eSIM module.

In the conventional technology, a mobile phone either supports a conventional SIM module and an eSIM module, but can implement only a dual-SIM single-standby function, or supports a conventional SIM module and an eSIM module, and can implement a dual-SIM dual-standby function. However, there is no solution that supports dual SIM modules and an eSIM module.

SUMMARY

Embodiments of this application provide a SIM module management method and an electronic device. A solution that supports an eSIM module is provided for an existing electronic device that supports dual SIM modules, so that the dual SIM modules are compatible with the eSIM module.

The following technical solutions are used in this application.

According to a first aspect, an embodiment of this application provides an electronic device. The electronic device may include a processor, a first modem, a second modem, a mobile communications module, a first SIM module interface, a second SIM module interface, and an eUICC. The eUICC is configured to store an eSIM module. The processor is coupled to the first modem, the second modem, the mobile communications module, the first SIM module interface, the second SIM module interface, and the eUICC. The processor is configured to control a connection relationship between the first SIM module interface, the second SIM module interface, and the eUICC and the first modem and the second modem.

According to the technical solution, a solution that supports an eSIM module is provided for an existing electronic device that supports dual SIM modules, so that the dual SIM modules are compatible with the eSIM module. In other words, the electronic device in this embodiment of this application may support three SIM modules, and can arbitrarily select, based on user settings, two SIM modules from the three SIM modules to be in online standby mode, or can arbitrarily select one SIM module from the three SIM modules to be in online standby mode.

In a possible implementation, the electronic device further includes an SCI, one end of the SCI is coupled to the processor, and the other end of the SCI is coupled to both the second SIM module interface and the eUICC. That the processor is configured to control a connection relationship between the first SIM module interface, the second SIM module interface, and the eUICC and the first modem and the second modem includes: The processor is configured to control, by controlling the SCI, a connection relationship between the second SIM module interface and the eUICC and the first modem and the second modem. In this way, a connection relationship between a plug-in SIM module connected to the second SIM module interface and an activated eSIM module in the eUICC and a network may be controlled by using the SCI.

In another possible implementation, the processor is further configured to perform card setting when detecting that any one of the following cases occurs: a first plug-in SIM module is inserted into the first SIM module interface; a second plug-in SIM module is inserted into the second SIM module interface; the first plug-in SIM module connected to the first SIM module interface is removed; the second plug-in SIM module connected to the second SIM module interface is removed; when the first SIM module interface is connected to the first plug-in SIM module, the first plug-in SIM module changes from an enabled state to a disabled state; when the second SIM module interface is connected to the second plug-in SIM module, the second plug-in SIM module changes from an enabled state to a disabled state; a first eSIM module changes from an enabled state to a disabled state, where the first eSIM module is a currently activated eSIM module stored in the eUICC; the first eSIM module is deleted; and a second eSIM module is installed and activated. When it is detected that a status of a SIM module changes, a primary card and a secondary card are set. This ensures connection between the electronic device and the network.

In another possible implementation, when the processor detects that the first plug-in SIM module is inserted into the first SIM module interface, that the processor performs card setting includes: The processor obtains card information of the first plug-in SIM module. The processor determines whether the electronic device activates the eSIM module. If the electronic device does not activate the eSIM module, and only the first plug-in SIM module is inserted into the electronic device, the processor sets the first plug-in SIM module as the primary card.

In another possible implementation, if the electronic device does not activate the eSIM module, the first plug-in SIM module and the second plug-in SIM module are inserted into the electronic device, and the second plug-in SIM module is connected to the second SIM module interface, when the processor determines, based on the card information, that the first plug-in SIM module is previously set by a user as the primary card, the processor sets the first plug-in SIM module as the primary card, and sets the second plug-in SIM module as a secondary card. Alternatively, when the processor determines, based on the card information, that the first plug-in SIM module is not previously set by a user as the primary card, if the first SIM module interface is a primary card slot, the processor sets the first plug-in SIM module as the primary card, and sets the second plug-in SIM module as a secondary card; or if the second SIM module interface is the primary card slot, the processor sets the second plug-in SIM module as the primary card, and sets the first plug-in SIM module as the secondary card. A card may be set based on obtained card information of a SIM module whose status changes and a setting habit of the user, so that when the status of the SIM module changes, the set primary card complies with the setting habit of the user, thereby improving use experience of the user.

In another possible implementation, if the electronic device activates the first eSIM module, when the processor determines, based on the card information, that the first plug-in SIM module is previously set by the user as the primary card, the processor sets the first plug-in SIM module as the primary card, and sets the first eSIM module as the secondary card. Alternatively, when the processor determines, based on the card information, that the first plug-in SIM module is not previously set by the user as the primary card, if the first SIM module interface is the primary card slot, the processor sets the first plug-in SIM module as the primary card, and sets the first eSIM module as the secondary card; or if the second SIM module interface is the primary card slot, the processor sets the first eSIM module as the primary card, and sets the first plug-in SIM module as the secondary card. The card may be set based on the obtained card information of the SIM module whose status changes and the setting habit of the user, so that when the status of the SIM module changes, the set primary card complies with the setting habit of the user, thereby improving use experience of the user.

In another possible implementation, when the processor detects that the second plug-in SIM module is inserted into the second SIM module interface, that the processor performs card setting includes: The processor obtains card information of the second plug-in SIM module. When the electronic device does not activate the eSIM module, and only the second plug-in SIM module is inserted into the electronic device, the processor sets the second plug-in SIM module as a primary card.

In another possible implementation, when the electronic device does not activate the eSIM module, the second plug-in SIM module and the first plug-in SIM module are inserted into the electronic device, and the first plug-in SIM module is connected to the first SIM module interface, when the processor determines, based on the card information, that the second plug-in SIM module is previously set by a user as the primary card, the processor sets the second plug-in SIM module as the primary card, and sets the first plug-in SIM module as a secondary card. Alternatively, when the processor determines, based on the card information, that the second plug-in SIM module is not previously set by a user as the primary card, if the second SIM module interface is a primary card slot, the processor sets the second plug-in SIM module as the primary card, and sets the first plug-in SIM module as the secondary card; or if the first SIM module interface is the primary card slot, the processor sets the first plug-in SIM module as the primary card, and sets the second plug-in SIM module as the secondary card. The card may be set based on the obtained card information of the SIM module whose status changes and the setting habit of the user, so that when the status of the SIM module changes, the set primary card complies with the setting habit of the user, thereby improving use experience of the user.

In another possible implementation, when the processor detects that the first plug-in SIM module connected to the first SIM module interface is removed, or when the first plug-in SIM module changes from the enabled state to the disabled state, if the first plug-in SIM module is set as a primary card, that the processor performs card setting includes: The processor determines whether the electronic device activates the eSIM module. If the electronic device does not activate the eSIM module, and the second SIM module interface is connected to the second plug-in SIM module, the processor sets the second plug-in SIM module as the primary card. Alternatively, if the electronic device activates the first eSIM module, and the second SIM module interface is not connected to a plug-in SIM module, the processor sets the first eSIM module as the primary card. Alternatively, if the electronic device activates the first eSIM module, and the second SIM module interface is connected to the second plug-in SIM module, when the eUICC is connected to a modem, the processor sets the first eSIM module as the primary card, and when the second SIM module interface is connected to the modem, the processor sets the second plug-in SIM module as the primary card.

In another possible implementation, when the processor detects that the second plug-in SIM module connected to the second SIM module interface is removed, or when the second plug-in SIM module changes from the enabled state to the disabled state, if the second plug-in SIM module is set as a primary card, that the processor performs card setting includes: The processor determines whether the electronic device activates the eSIM module. If the electronic device does not activate the eSIM module, and the first SIM module interface is connected to the first plug-in SIM module, the processor sets the first plug-in SIM module as the primary card. Alternatively, if the electronic device activates the first eSIM module, the processor sets the first eSIM module as the primary card.

In another possible implementation, when the processor detects that the first eSIM module changes from the enabled state to the disabled state, if the first eSIM module is set as a primary card, that the processor performs card setting includes: The processor determines whether the second SIM module interface is connected to a plug-in SIM module. If the second SIM module interface is connected to the second plug-in SIM module, the processor sets the second plug-in SIM module as the primary card. Alternatively, if the second SIM module interface is not connected to the plug-in SIM module, and the first SIM module interface is connected to the first plug-in SIM module, the processor sets the first plug-in SIM module as the primary card.

In another possible implementation, when the processor detects that the second eSIM module is installed and activated, that the processor performs card setting includes: The processor obtains card information of the second eSIM module. If no plug-in SIM module is inserted into the first SIM module interface, the processor sets the second eSIM module as a primary card. Alternatively, if the first plug-in SIM module is inserted into the first SIM module interface, when the processor determines, based on the card information, that the second eSIM module is previously set by a user as a primary card, the processor sets the second eSIM module as the primary card, and sets the first plug-in SIM module as a secondary card; or when the processor determines, based on the card information, that the second eSIM module is not previously set by a user as a primary card, if the first SIM module interface is a primary card slot, the processor sets the first plug-in SIM module as the primary card, and sets the second eSIM module as a secondary card, or if the second SIM module interface is the primary card slot, the processor sets the second eSIM module as the primary card, and sets the first plug-in SIM module as the secondary card. The card may be set based on the obtained card information of the SIM module whose status changes and the setting habit of the user, so that when the status of the SIM module changes, the set primary card complies with the setting habit of the user, thereby improving use experience of the user.

In another possible implementation, when the processor detects that the first eSIM module is deleted, if the eUICC is currently connected to a modem, and the first eSIM module is set as a primary card, that the processor performs card setting includes: The processor determines whether the second SIM module interface is connected to a plug-in SIM module. If the second SIM module interface is connected to the second plug-in SIM module, the processor sets the second plug-in SIM module as the primary card. Alternatively, if the second SIM module interface is not connected to the plug-in SIM module, and the first SIM module interface is connected to the first plug-in SIM module, the processor sets the first plug-in SIM module as the primary card.

According to a second aspect, an embodiment of this application provides a SIM module management method. The method may be applied to an electronic device, and the electronic device may include a first SIM module interface, a second SIM module interface, and an eUICC. The eUICC is configured to store an eSIM module. The electronic device connects to a network through two SIM modules in a first plug-in SIM module connected to the first SIM module interface, a second plug-in SIM module connected to the second SIM module interface, and a currently activated eSIM module in the eUICC, or connects to the network through any one of the three SIM modules.

According to the technical solution, a solution that supports an eSIM module is provided for an existing electronic device that supports dual SIM modules, so that the dual SIM modules are compatible with the eSIM module. In other words, the electronic device in this embodiment of this application may support three SIM modules, and the electronic device can arbitrarily select, based on user settings, two SIM modules from the three SIM modules to be in online standby mode, or can arbitrarily select one SIM module from the three SIM modules to be in online standby mode.

It should be noted that, in some embodiments, the electronic device may not include the eUICC, but implements the eSIM module in an all-software manner. In this case, the electronic device may not include the eSIM module, and the electronic device includes the eSIM module only after a user downloads the eSIM module.

In a possible implementation, that the electronic device connects to a network through two SIM modules in a first plug-in SIM module connected to the first SIM module interface, a second plug-in SIM module connected to the second SIM module interface, and a currently activated eSIM module in the eUICC includes: The electronic device connects to the network through either of the second plug-in SIM module and the currently activated eSIM module in the eUICC, and the first plug-in SIM module.

In another possible implementation, the method may further include: The electronic device performs card setting when detecting that any one of the following cases occurs: the first plug-in SIM module is inserted into the first SIM module interface; the second plug-in SIM module is inserted into the second SIM module interface; the first plug-in SIM module connected to the first SIM module interface is removed; the second plug-in SIM module connected to the second SIM module interface is removed; when the first SIM module interface is connected to the first plug-in SIM module, the first plug-in SIM module changes from an enabled state to a disabled state; when the second SIM module interface is connected to the second plug-in SIM module, the second plug-in SIM module changes from an enabled state to a disabled state; a first eSIM module changes from an enabled state to a disabled state, where the first eSIM module is a currently activated eSIM module stored in the eUICC; the first eSIM module is deleted; and a second eSIM module is installed and activated.

In another possible implementation, when the electronic device detects that the first plug-in SIM module is inserted into the first SIM module interface, that the electronic device performs card setting includes: The electronic device obtains card information of the first plug-in SIM module. The electronic device determines whether the electronic device activates the eSIM module. If the electronic device does not activate the eSIM module, and only the first plug-in SIM module is inserted into the electronic device, the electronic device sets the first plug-in SIM module as a primary card.

In another possible implementation, if the electronic device does not activate the eSIM module, the first plug-in SIM module and the second plug-in SIM module are inserted into the electronic device, and the second plug-in SIM module is connected to the second SIM module interface, when the electronic device determines, based on the card information, that the first plug-in SIM module is previously set by the user as the primary card, the electronic device sets the first plug-in SIM module as the primary card, and sets the second plug-in SIM module as a secondary card. Alternatively, when the electronic device determines, based on the card information, that the first plug-in SIM module is not previously set by the user as the primary card, if the first SIM module interface is a primary card slot, the electronic device sets the first plug-in SIM module as the primary card, and sets the second plug-in SIM module as the secondary card; or if the second SIM module interface is the primary card slot, the electronic device sets the second plug-in SIM module as the primary card, and sets the first plug-in SIM module as the secondary card.

In another possible implementation, if the electronic device activates the first eSIM module, when the electronic device determines, based on the card information, that the first plug-in SIM module is previously set by the user as the primary card, the electronic device sets the first plug-in SIM module as the primary card, and sets the first eSIM module as the secondary card. Alternatively, when the electronic device determines, based on the card information, that the first plug-in SIM module is not previously set by the user as the primary card, if the first SIM module interface is the primary card slot, the electronic device sets the first plug-in SIM module as the primary card, and sets the first eSIM module as the secondary card; or if the second SIM module interface is the primary card slot, the electronic device sets the first eSIM module as the primary card, and sets the first plug-in SIM module as the secondary card.

In another possible implementation, when the electronic device detects that the second plug-in SIM module is inserted into the second SIM module interface, that the electronic device performs card setting includes: The electronic device obtains card information of the second plug-in SIM module. When the electronic device does not activate the eSIM module, and only the second plug-in SIM module is inserted into the electronic device, the electronic device sets the second plug-in SIM module as a primary card.

In another possible implementation, when the electronic device does not activate the eSIM module, the second plug-in SIM module and the first plug-in SIM module are inserted into the electronic device, and the first plug-in SIM module is connected to the first SIM module interface, when the electronic device determines, based on the card information, that the second plug-in SIM module is previously set by the user as the primary card, the electronic device sets the second plug-in SIM module as the primary card, and sets the first plug-in SIM module as a secondary card. Alternatively, when the electronic device determines, based on the card information, that the second plug-in SIM module is not previously set by the user as the primary card, if the second SIM module interface is a primary card slot, the electronic device sets the second plug-in SIM module as the primary card, and sets the first plug-in SIM module as the secondary card; or if the first SIM module interface is the primary card slot, the electronic device sets the first plug-in SIM module as the primary card, and sets the second plug-in SIM module as the secondary card.

In another possible implementation, when the electronic device detects that the first plug-in SIM module connected to the first SIM module interface is removed, or when the first plug-in SIM module changes from the enabled state to the disabled state, if the first plug-in SIM module is set as a primary card, that the electronic device performs card setting includes: The electronic device determines whether the electronic device activates the eSIM module. If the electronic device does not activate the eSIM module, and the second SIM module interface is connected to the second plug-in SIM module, the electronic device sets the second plug-in SIM module as the primary card. Alternatively, if the electronic device activates the first eSIM module, and the second SIM module interface is not connected to a plug-in SIM module, the electronic device sets the first eSIM module as the primary card. Alternatively, if the electronic device activates the first eSIM module, and the second SIM module interface is connected to the second plug-in SIM module, when the electronic device connects to the network through the first eSIM module in the eUICC, the electronic device sets the first eSIM module as the primary card, and when the electronic device connects to the network through the second plug-in SIM module connected to the second SIM module interface, the electronic device sets the second plug-in SIM module as the primary card.

In another possible implementation, when the electronic device detects that the second plug-in SIM module connected to the second SIM module interface is removed, or when the second plug-in SIM module changes from the enabled state to the disabled state, if the second plug-in SIM module is set as a primary card, that the electronic device performs card setting includes: The electronic device determines whether the electronic device activates the eSIM module. If the electronic device does not activate the eSIM module, and the first SIM module interface is connected to the first plug-in SIM module, the electronic device sets the first plug-in SIM module as the primary card. Alternatively, if the electronic device activates the first eSIM module, the electronic device sets the first eSIM module as the primary card.

In another possible implementation, when the electronic device detects that the first eSIM module changes from the enabled state to the disabled state, if the first eSIM module is set as a primary card, that the electronic device performs card setting includes: The electronic device determines whether the second SIM module interface is connected to a plug-in SIM module. If the second SIM module interface is connected to the second plug-in SIM module, the electronic device sets the second plug-in SIM module as the primary card. Alternatively, if the second SIM module interface is not connected to the plug-in SIM module, and the first SIM module interface is connected to the first plug-in SIM module, the electronic device sets the first plug-in SIM module as the primary card.

In another possible implementation, when the electronic device detects that the second eSIM module is installed and activated, that the electronic device performs card setting includes: The electronic device obtains card information of the second eSIM module. If no plug-in SIM module is inserted into the first SIM module interface, the electronic device sets the second eSIM module as a primary card. Alternatively, if the first plug-in SIM module is inserted into the first SIM module interface, when the electronic device determines, based on the card information, that the second eSIM module is previously set by the user as a primary card, the electronic device sets the second eSIM module as the primary card, and sets the first plug-in SIM module as a secondary card; or when the electronic device determines, based on the card information, that the second eSIM module is not previously set by the user as a primary card, if the first SIM module interface is a primary card slot, the electronic device sets the first plug-in SIM module as the primary card, and sets the second eSIM module as a secondary card, or if the second SIM module interface is the primary card slot, the electronic device sets the second eSIM module as the primary card, and sets the first plug-in SIM module as the secondary card.

In another possible implementation, when the electronic device detects that the first eSIM module is deleted, if the electronic device currently connects to the network through the first eSIM module in the eUICC, and the first eSIM module is set as a primary card, that the electronic device performs card setting includes: The electronic device determines whether the second SIM module interface is connected to a plug-in SIM module. If the second SIM module interface is connected to the second plug-in SIM module, the electronic device sets the second plug-in SIM module as the primary card. Alternatively, if the second SIM module interface is not connected to the plug-in SIM module, and the first SIM module interface is connected to the first plug-in SIM module, the electronic device sets the first plug-in SIM module as the primary card.

In another possible implementation, that the electronic device connects to the network through either of the second plug-in SIM module and the currently activated eSIM module in the eUICC includes: The electronic device displays a first interface. The first interface includes a first button and a second button. The electronic device receives a selection operation performed by the user on the first button. The first button is selected and the second button is not selected. In response to the selection operation on the first button, the electronic device connects to the network through the second plug-in SIM module. The electronic device receives a selection operation performed by the user on the second button. The second button is selected and the first button is not selected. In response to the selection operation on the second button, the electronic device connects to the network through the second plug-in SIM module.

In another possible implementation, the method may further include: The electronic device displays a second interface. The second interface includes a third button. The electronic device receives an operation performed by the user on the third button. The electronic device changes the first plug-in SIM module from the enabled state to the disabled state in response to the operation on the third button.

In another possible implementation, the method may further include: The electronic device displays a third interface. The third interface includes a fourth button. The electronic device receives an operation performed by the user on the fourth button. The electronic device changes the second plug-in SIM module from the enabled state to the disabled state in response to the operation on the fourth button.

In another possible implementation, the method may further include: The electronic device displays a fourth interface. The fourth interface includes a fifth button. The electronic device receives an operation performed by the user on the fifth button. The electronic device changes the first eSIM module from the enabled state to the disabled state in response to the operation on the fifth button.

In another possible implementation, a SIM module set as the primary card is used by the electronic device to transmit mobile data, and a SIM module set as the secondary card cannot be used by the electronic device to transmit mobile data.

According to a third aspect, an embodiment of this application provides a computer-readable storage medium, including computer instructions. When the computer instructions are run on an electronic device, the electronic device is enabled to perform the SIM module management method according to any one of the second aspect or the possible implementations of the second aspect.

According to a fourth aspect, an embodiment of this application provides a computer program product. When the computer program product runs on a computer, the computer is enabled to perform the SIM module management method according to any one of the second aspect or the possible implementations of the second aspect.

According to a fifth aspect, an embodiment of this application provides a chip system. The chip system is applied to an electronic device. The chip system includes an interface circuit and a processor. The interface circuit and the processor are interconnected through a line. The interface circuit is configured to receive a signal from a memory of the electronic device, and send the signal to the processor. The signal includes computer instructions stored in the memory. When the processor executes the computer instructions, the chip system performs the SIM module management method according to any one of the second aspect or the possible implementations of the second aspect.

According to a sixth aspect, an apparatus is provided. The apparatus has a function of implementing behavior of the electronic device in the method according to the second aspect. The function may be implemented by hardware, or may be implemented by hardware executing corresponding software. The hardware or the software includes one or more modules corresponding to the function, for example, a communications unit or module, or a settings unit or module.

It may be understood that the method according to the second aspect, the computer-readable storage medium according to the third aspect, the computer program product according to the fourth aspect, the chip system according to the fifth aspect, and the apparatus according to the sixth aspect all correspond to the electronic device according to the first aspect. Therefore, for beneficial effects that can be achieved, refer to beneficial effects in the corresponding electronic device provided above. Details are not described herein again.

BRIEF DESCRIPTION OF DRAWINGS

FIG. 10A and FIG. 10B are a schematic flowchart of updating a card account of an eSIM module according to an embodiment of this application;

DESCRIPTION OF EMBODIMENTS

Figure 1:
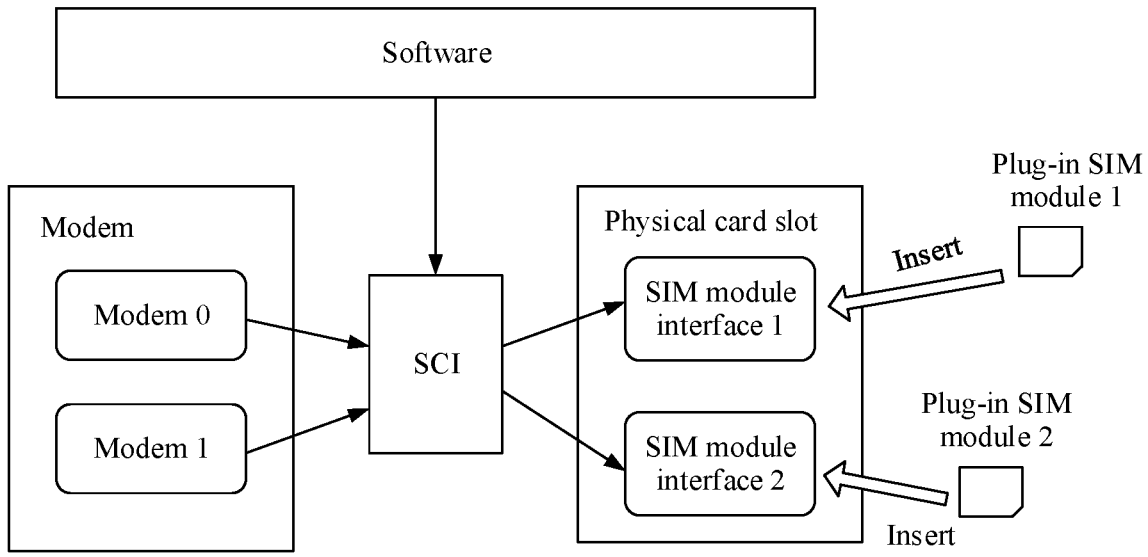
FIG. 1 is a schematic diagram of a structural composition of an electronic device supporting dual plug-in SIM modules according to an embodiment of this application.

For ease of understanding, some concepts related to the embodiments of this application are provided as an example for reference. As shown in the following:

Plug-in SIM module: The plug-in SIM module refers to a conventional SIM module, or referred to as a SIM module chip. This type of SIM module can be used only after a user selects a number to access a network at a customer service center of a carrier or through an online customer service center of the carrier, and the SIM module is inserted into a physical card slot (or referred to as a SIM module interface) of an electronic device after being activated. For example, the electronic device may be connected to a cellular mobile network through the SIM module, to implement functions such as calling and data communication. The plug-in SIM module can also be removed from the physical card slot.

eSIM module: referred to as an embedded-SIM, or an embedded SIM module. In the eSIM module, a pluggable physical entity in the plug-in SIM module is abandoned, and a universal integrated circuit card (universal integrated circuit card, UICC) is embedded in the electronic device (not detachable from the electronic device), instead of being added to the electronic device as an independent removable component, which is referred to as an embedded UICC, an eUICC, or is referred to as an eSIM module chip. The eUICC may store a plurality of types of eSIM profiles of the carrier, and each type of eSIM profile may independently form a SIM application. The SIM application may be referred to as an eSIM module. The eSIM module may implement a function similar to that of the plug-in SIM module. The eSIM module allows the user to more flexibly select carrier packages or change a carrier at any time without unlocking a device or purchasing a new device. There are two packaging forms of the eUICC. One is a surface mount device (surface mount device, SMD) chip packaging process, that is, a SIM module chip is directly soldered to a module of the electronic device. The other is a SIP (Simple in Package) packaging process, that is, the SIM module chip and a module chip of the electronic device are packaged together, and appear to be one chip on the outside. The eSIM module is an unpluggable SIM module that can be used in any electronic device. A major difference between the eSIM module and the plug-in SIM module is that the eSIM module is fixed in the electronic device and cannot be replaced randomly.

Both the plug-in SIM module and the eSIM module may be referred to as a hard SIM module. An identifier used to identify the plug-in SIM module and the eSIM module may be referred to as an integrate circuit card identity (integrate circuit card identity, ICCID). An identifier used to identify the eUICC may be referred to as an embedded universal integrated circuit card identifier (eUICC identifier, EID).

A softSIM (softSIM) module, also referred to as a virtual-SIM (virtual-SIM, vSIM) module, is a SIM module different from the hard SIM module. The softSIM module is a virtual entity, that is, there is no physical SIM module, and communication is implemented based on software and hardware of a communications module. A communications module with a vSIM function works with underlying software customized for the vSIM to implement built-in encrypted storage of data (such as IMSI and KI). During network login, authentication, and communication, corresponding logic is automatically processed, so that stable mobile communication experience is provided without the physical SIM module.

Multi-SIM single-standby function: The multi-SIM single-standby function may mean that an electronic device such as a mobile phone may be connected to a plurality of SIM modules at the same time, and only one SIM module of the plurality of SIM modules may be in online standby mode at the same time, in other words, the electronic device may be connected to the cellular mobile network through only one of the SIM modules at the same time, so as to be used for data exchange, and implement functions such as calling and data communication.

Multi-SIM dual-standby function: The multi-SIM dual-standby function may mean that an electronic device such as a mobile phone may be connected to a plurality of SIM modules at the same time, and two SIM modules in the plurality of SIM modules may be in online standby mode at the same time, in other words, the electronic device may be connected to the cellular mobile network through two of the SIM modules at the same time, so as to be used for data exchange, and implement functions such as calling and data communication.

It should be noted that the plurality of SIM modules may refer to two or more SIM modules. In addition, each of the plurality of SIM modules may be the plug-in SIM module, the eSIM module, or the softSIM module.

Currently, an eSIM technology is gradually widely used on products such as a tablet and a personal computer (personal computer, PC) in addition to a wearable device. In addition, the eSIM module tends to be used on the mobile phone.

In the conventional technology, the mobile phone supports only the plug-in SIM module; or supports only the eSIM module; or supports one plug-in SIM module and one eSIM module, but only a dual-SIM single-standby function can be implemented; or supports one plug-in SIM module and one eSIM module, and a dual-SIM dual-standby function can be implemented.

However, there are a large quantity of mobile phones that support dual SIM modules in the market, and a proportion of dual-SIM users is also high. The dual SIM modules may be two plug-in SIM modules, or may be one plug-in SIM module and one softSIM module. However, there is no existing solution that supports the dual SIM modules and the eSIM module.

This application provides a solution that supports the dual SIM modules and the eSIM module. That is, in the embodiments of this application, the electronic device may support three SIM modules. The three SIM modules include at least one eSIM module. The remaining two SIM modules may be both plug-in SIM modules, or may be one plug-in SIM module and one softSIM module. The user can arbitrarily select two SIM modules from the three SIM modules to be in online standby mode, or can arbitrarily select one SIM module from the three SIM modules to be in online standby mode.

In addition, in the embodiments of this application, each of the three SIM modules supported by the electronic device may be a SIM module that supports any one of a global system for mobile communication (global system for mobile communication, GSM) standard, a universal mobile telecommunications system (universal mobile telecommunications system, UMTS) standard, a time division-synchronous code division multiple access (time division-synchronous code division multiple access, TD-SCDMA) standard, a long term evolution (long term evolution, LTE) standard, and a code division multiple access (code division multiple access, CDMA) standard. A standard supported by a SIM module in the electronic device is not specifically limited in the embodiments.

For ease of description, in the following embodiments, an example in which the electronic device supports two plug-in SIM modules and one eSIM module is used to describe the embodiments of this application in detail.

For example, FIG. 1 is a schematic diagram of a structural composition of an electronic device supporting dual plug-in SIM modules according to an embodiment of this application. As shown in FIG. 1, the electronic device may include a SIM module interface 1 and a SIM module interface 2 (a SIM module interface may also be referred to as a physical card slot, that is, the electronic device may include a physical card slot 1 and a physical card slot 2), which can be used to connect to a plug-in SIM module separately. For example, the SIM module interface 1 may be configured to connect to a plug-in SIM module 1, and the SIM module interface 2 may be configured to connect to a plug-in SIM module 2. The electronic device further includes a modem (modem) 0, a modem 1, and a smart card interface (smart card interface, SCI). Software at an upper layer of the hardware may control connection relationships between different modems and different SIM module interfaces through the SCI based on a user selection. When the two SIM module interfaces are both connected to a plug-in SIM module, the electronic device may be connected to a cellular mobile network through each plug-in SIM module and a modem connected to the plug-in SIM module, so as to perform data exchange, implement functions such as calling and data communication, and implement a dual-SIM dual-standby function.

Figure 2:
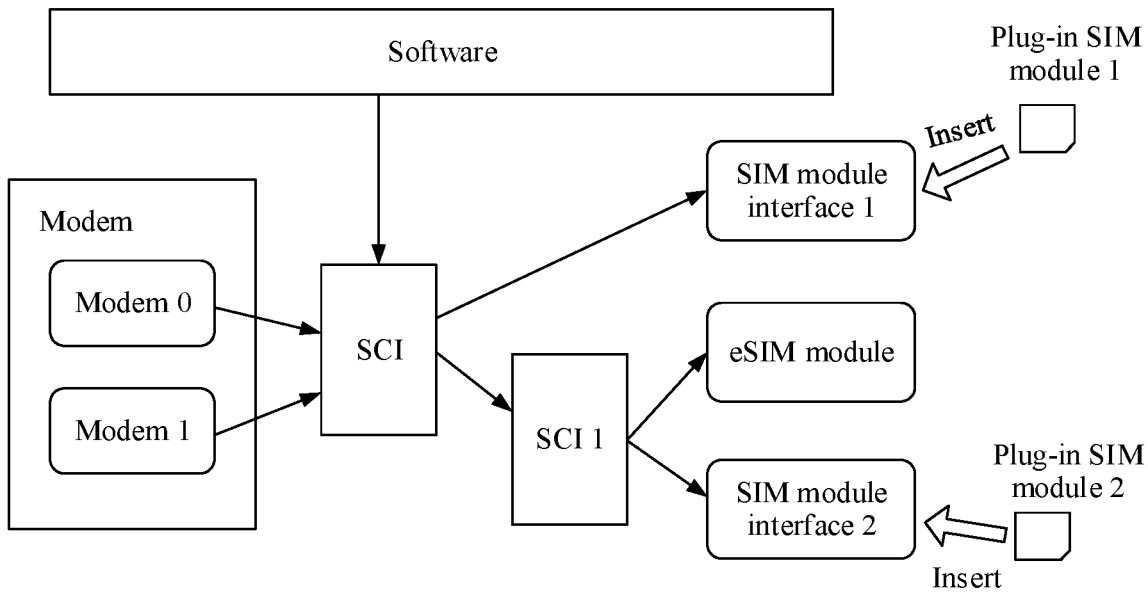
FIG. 2 is a schematic diagram of a structural composition of an electronic device supporting dual plug-in SIM modules and an eSIM module according to an embodiment of this application.

FIG. 2 is a schematic diagram of a structural composition of an electronic device supporting dual plug-in SIM modules and an eSIM module according to an embodiment of this application. As shown in FIG. 2, in addition to the components of the electronic device shown in FIG. 1, the electronic device may further include the eSIM module (or an eUICC, where the eUICC is configured to store the eSIM module), and an SCI 1. The SCI 1 cooperates with the SCI, and is configured to control connection relationships between different modems and different SIM module interfaces or the eSIM module (or the eUICC). When two SIM module interfaces (namely, physical card slots) are both connected to a plug-in SIM module, and the eSIM module is activated, the electronic device may be connected to a cellular mobile network through two of the three SIM modules (for example, two plug-in SIM modules, or one plug-in SIM module and one eSIM module), and modems connected to the SIM modules, to perform data exchange, implement functions such as calling and data communication, and implement a three-SIM dual-standby function.

Certainly, when neither of the two SIM module interfaces are connected to the plug-in SIM module, and only the eSIM module is activated, the electronic device may also be connected to the cellular mobile network through the eSIM module and a modem connected to the eSIM module. Alternatively, when a SIM module interface 1 is connected to the plug-in SIM module, but a SIM module interface 2 is not connected to the plug-in SIM module, and the eSIM module is activated, the electronic device may also be connected to the cellular mobile network through the plug-in SIM module, the eSIM module, and modems connected to the plug-in SIM module and the eSIM module. Alternatively, when the SIM module interface 2 is connected to the plug-in SIM module, but the SIM module interface 1 is not connected to the plug-in SIM module, and the eSIM module is activated, the electronic device may be connected to the cellular mobile network through the plug-in SIM module or the eSIM module, and a modem connected to the plug-in SIM module or the eSIM module. Alternatively, when the two SIM module interfaces are both connected to the plug-in SIM module, but the eSIM module is not activated, the electronic device may also be connected to the cellular mobile network through the two plug-in SIM modules and modems connected to the two plug-in SIM modules. Alternatively, when either of the two SIM module interfaces is connected to the plug-in SIM module, and the eSIM module is not activated, the electronic device may also be connected to the cellular mobile network through the plug-in SIM module and a modem connected to the plug-in SIM module.

Functions of the SCI and the SCI 1 may be implemented by hardware, or may be implemented by software. This is not specifically limited in this embodiment.

Figure 3:
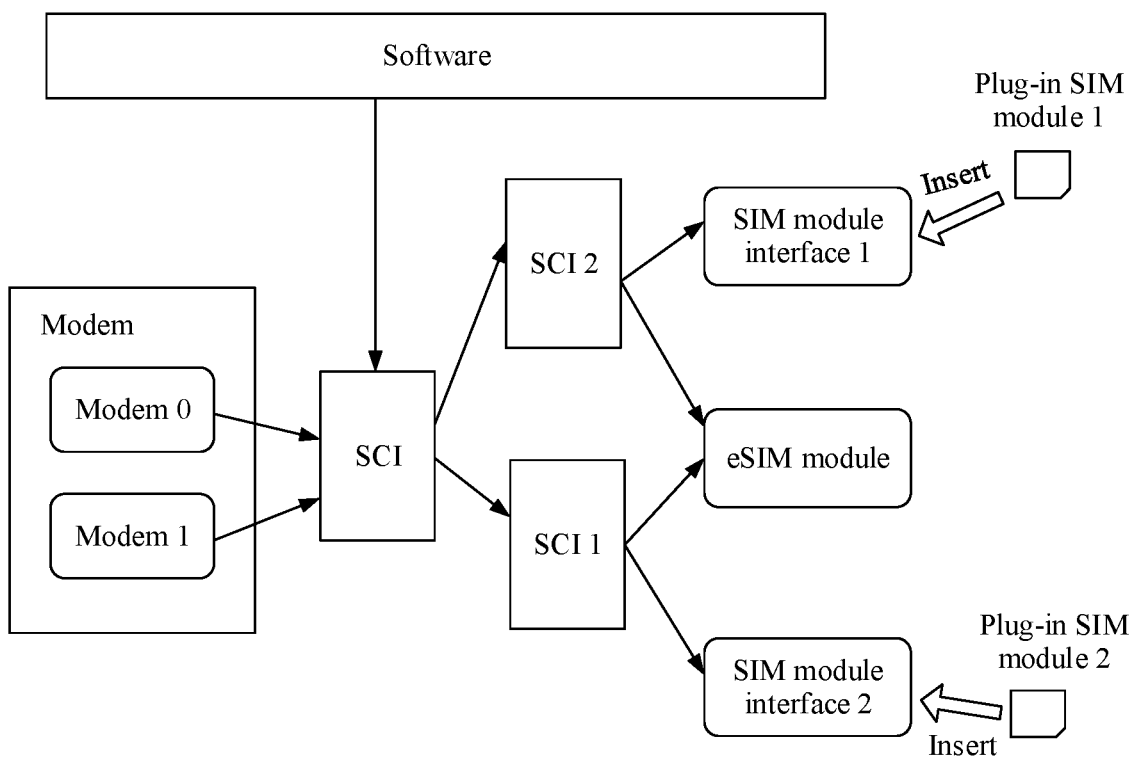
FIG. 3 is a schematic diagram of a structural composition of another electronic device supporting dual plug-in SIM modules and an eSIM module according to an embodiment of this application.

In addition, it should be noted that, in this embodiment of this application, the schematic diagram of the structural composition of the electronic device supporting dual plug-in SIM modules and an eSIM module in FIG. 2 uses an example in which the eSIM module (or the eUICC) is connected to the SIM module interface 2 in hardware for illustration. That is, only one of the eSIM module and a plug-in SIM module 2 inserted into the SIM module interface 2 can be in online standby mode. In other words, only a plug-in SIM module 1 inserted into the SIM module interface 1 can implement a dual-standby function with the eSIM module or the plug-in SIM module 2 inserted into the SIM module interface 2. In some other embodiments, the eSIM module (or the eUICC) may also be connected to the SIM module interface 1 in hardware. In this way, only one of the eSIM module and the plug-in SIM module 1 inserted into the SIM module interface 1 can be in online standby mode. In other words, only the plug-in SIM module 2 inserted into the SIM module interface 2 can implement the dual-standby function with the eSIM module or the plug-in SIM module 1 inserted into the SIM module interface 1. In some other embodiments, the eSIM module (or the eUICC) may also be connected to both the SIM module interface 1 and the SIM module interface 2 in hardware. For example, as shown in FIG. 3, in addition to hardware of the electronic device shown in FIG. 2, the electronic device may further include an SCI 2. The SCI 2, the SCI 1, and the SCI cooperate to control connection relationships between different modems and different SIM module interfaces or different eSIM modules. In this way, the plug-in SIM module 1 may implement the dual-standby function with the eSIM module or the plug-in SIM module 2. In addition, the plug-in SIM module 2 may further implement the dual-standby function with the eSIM module or the plug-in SIM module 1.

For example, the electronic device in the embodiments of this application may be a device that can be connected to at least two plug-in SIM modules and supports an eSIM module. For example, the electronic device may be a mobile phone, a smart band, a smart watch, a tablet computer, or the like. A specific form of the electronic device is not specifically limited in the embodiments. The following embodiments use a mobile phone as an example to describe how an electronic device that can be connected to at least two plug-in SIM modules and supports an eSIM module implements the specific technical solution in the embodiments.

The following describes implementations of the embodiments of this application in detail with reference to the accompanying drawings.

Figure 4:
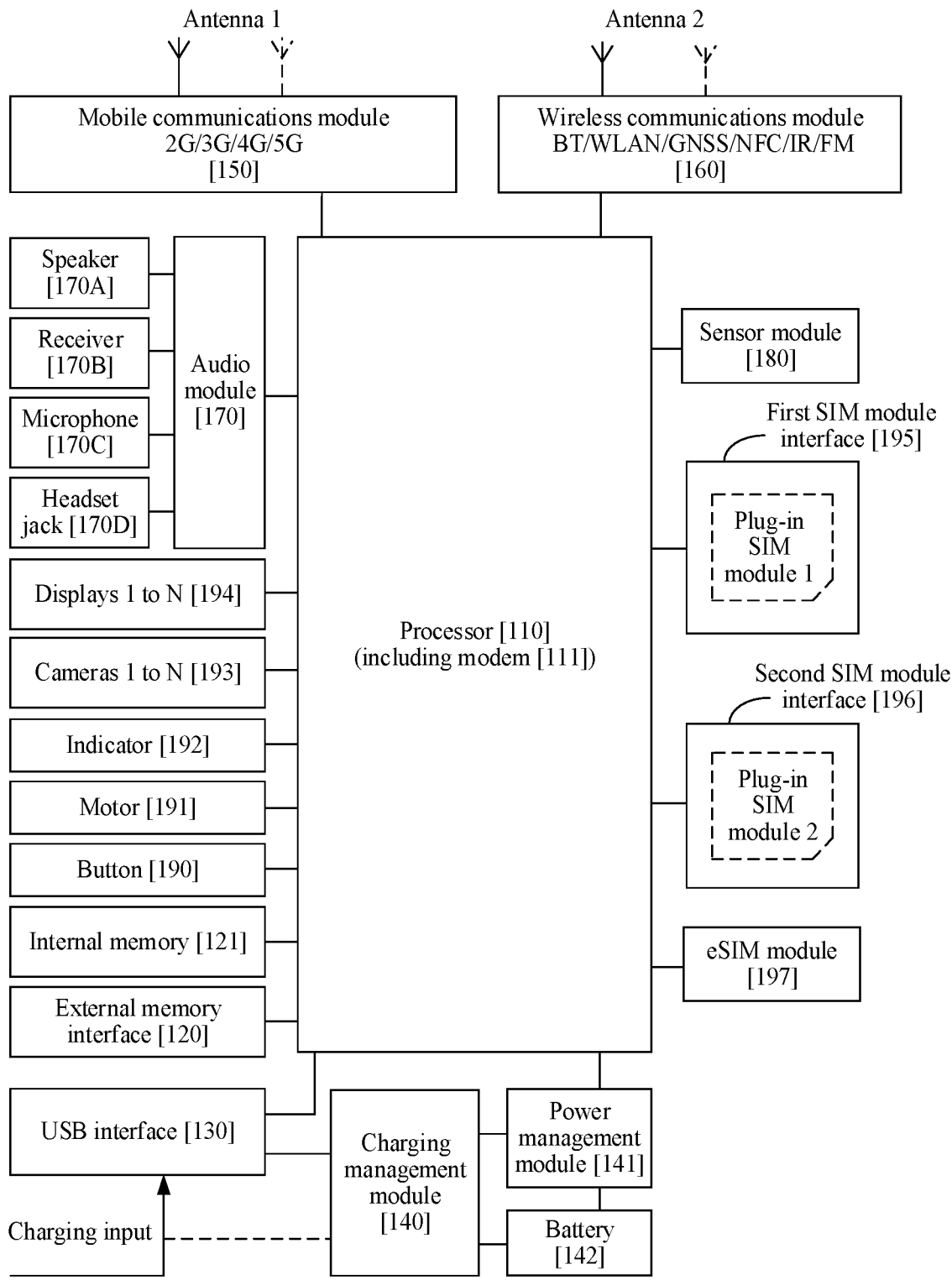
FIG. 4 is a schematic diagram of a hardware structure of an electronic device according to an embodiment of this application.

FIG. 4 is a schematic diagram of a hardware structure of an electronic device according to an embodiment of this application. As shown in FIG. 4, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a first SIM module interface 195, a second SIM module interface 196, an eSIM module 197 (or an eUICC included in the electronic device, where the eUICC is configured to store the eSIM module 197), and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem 111, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU) and/or the like. Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The first SIM module interface 195 (for example, a SIM module interface 1) may be configured to connect to a plug-in SIM module 1. The plug-in SIM module 1 is inserted into the first SIM module interface 195 or removed from the first SIM module interface 195, to implement contact with or separation from the electronic device. The second SIM module interface 196 (for example, a SIM module interface 2) may be configured to connect to a plug-in SIM module 2. The plug-in SIM module 2 is inserted into the second SIM module interface 196 or removed from the second SIM module interface 196, to implement contact with or separation from the electronic device. The electronic device may be connected to a network through the plug-in SIM module 1 and/or the plug-in SIM module 2, to implement functions such as calling and data communication.

For example, the first SIM module interface 195 and the second SIM module interface 196 may be SIM module connectors, including a main body having a SIM module accommodating space, and a plurality of communication slots for receiving conductive terminals of the SIM module. A SIM module interface may perform signaling transmission with the SIM module through the conductive terminal and the slot. In addition, the first SIM module interface 195 and the second SIM module interface 196 may support a plurality of SIM module sizes, so as to be compatible with different types of SIM modules, such as a nano-SIM module, a micro-SIM module, the SIM module, and the like. The first SIM module interface 195 and the second SIM module interface 196 may also be compatible with an external storage card.

A universal integrated circuit card is embedded in the electronic device, which is referred to as an eUICC. The eUICC may store a plurality of types of eSIM profiles of a carrier, and each type of eSIM profile may independently form a SIM application. The SIM application may be referred to as the eSIM module 197. The electronic device may be connected to the network through the eSIM module 197, to implement functions such as calling and data communication.

The charging management module 140 is configured to receive a charging input from a charger. The charger may be a wireless charger or a wired charger. The charging management module 140 may further supply power to the electronic device through the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. In some other embodiments, the power management module 141 may alternatively be disposed in the processor 110. In some other embodiments, the power management module 141 and the charging management module 140 may alternatively be disposed in a same device.

A wireless communication function of the electronic device may be implemented by using the antenna 1, the antenna 2, the mobile communications module 150, the wireless communications module 160, the modem 111, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem 111 for demodulation. The mobile communications module 150 may further amplify a signal modulated by the modem 111, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 may be disposed in the same device as at least some modules of the processor 110.

The modem 111 may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, or the like), or displays an image or a video through the display 194. In some embodiments, the modem 111 may be an independent component. In some other embodiments, the modem 111 may be independent of the processor 110, and is disposed in a same device as the mobile communications module 150 or another function module.

The wireless communications module 160 may provide wireless communication solutions, applied to the electronic device, for example, a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with the network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like. The ISP is configured to process data fed back by the camera 193. The ISP may further perform algorithm optimization on noise, brightness, and complexion of the image. The ISP may further optimize parameters such as exposure and color temperature of a photographing scenario. In some embodiments, the ISP may be disposed in the camera 193. The camera 193 is configured to capture a static image or a video. In some embodiments, the electronic device may include one or N cameras 193, where N is a positive integer greater than 1.

The external memory interface 120 may be configured to connect to an external memory card, for example, a micro SD card, to extend a storage capability of the electronic device. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, an application required by at least one function (such as a sound playing function or an image playing function), and the like. The data storage area may store data (for example, audio data or a phone book) created in a process of using the electronic device. In addition, the internal memory 121 may include a high-speed random access memory, and may further include a nonvolatile memory such as at least one magnetic disk storage device, a flash memory, or a universal flash storage (universal flash storage, UFS).

The electronic device may implement an audio function by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mike" or a "mic", is configured to convert a sound signal into an electrical signal. When making a call, sending voice information, or needing to trigger, by using a voice assistant, the electronic device to perform some functions, a user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. The pressure sensor is configured to sense a pressure signal, and can convert the pressure signal into an electrical signal. In some embodiments, the pressure sensor may be disposed on the display 194.

The gyroscope sensor may be configured to determine a motion posture of the electronic device. In some embodiments, an angular velocity of the electronic device around three axes (that is, x, y, and z axes) may be determined by using the gyroscope sensor. The barometric pressure sensor is configured to measure barometric pressure. The magnetic sensor includes a Hall sensor. The electronic device may detect opening and closing of a flip cover by using the magnetic sensor.

The acceleration sensor may detect accelerations in various directions (usually on three axes) of the electronic device, and may detect a magnitude and a direction of gravity when the electronic device is stationary. The acceleration sensor may be further configured to identify a posture of the electronic device, and applied to an application such as switching between landscape mode and portrait mode or a pedometer. The distance sensor is configured to measure a distance. The electronic device may measure a distance through infrared or laser.

The electronic device may detect, by using the optical proximity sensor, that the user puts the electronic device close to an ear for making a call, so that automatic screen-off is implemented to achieve power saving. The ambient light sensor is configured to sense ambient light brightness. The ambient light sensor may also cooperate with the optical proximity sensor to detect whether the electronic device is in a pocket, to avoid an accidental touch.

The fingerprint sensor is configured to collect a fingerprint. The electronic device may use a feature of the collected fingerprint to implement fingerprint-based unlocking, application lock access, fingerprint-based photographing, fingerprint-based call answering, and the like. The temperature sensor is configured to detect a temperature. In some embodiments, the electronic device executes a temperature processing policy based on the temperature detected by the temperature sensor.

The touch sensor is also referred to as a "touch panel". The touch sensor may be disposed on the display 194, and the touch sensor and the display 194 form a touchscreen, which is also referred to as a "touch screen". The touch sensor is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor may alternatively be disposed on a surface of the electronic device at a location different from that of the display 194. The bone conduction sensor may obtain a vibration signal.

The button 190 includes a power button, a volume button, and the like. The button 190 may be a mechanical button, or may be a touch-sensitive button. The electronic device may receive a key input, and generate a key signal input related to a user setting and function control of the electronic device. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like.

In addition, a software system of the electronic device may use a layered architecture, an event-driven architecture, a microkernel architecture, a microservice architecture, or a cloud architecture. In this embodiment of this application, an Android system with a layered architecture is used as an example to describe a software structure of an electronic device.

Figure 5:
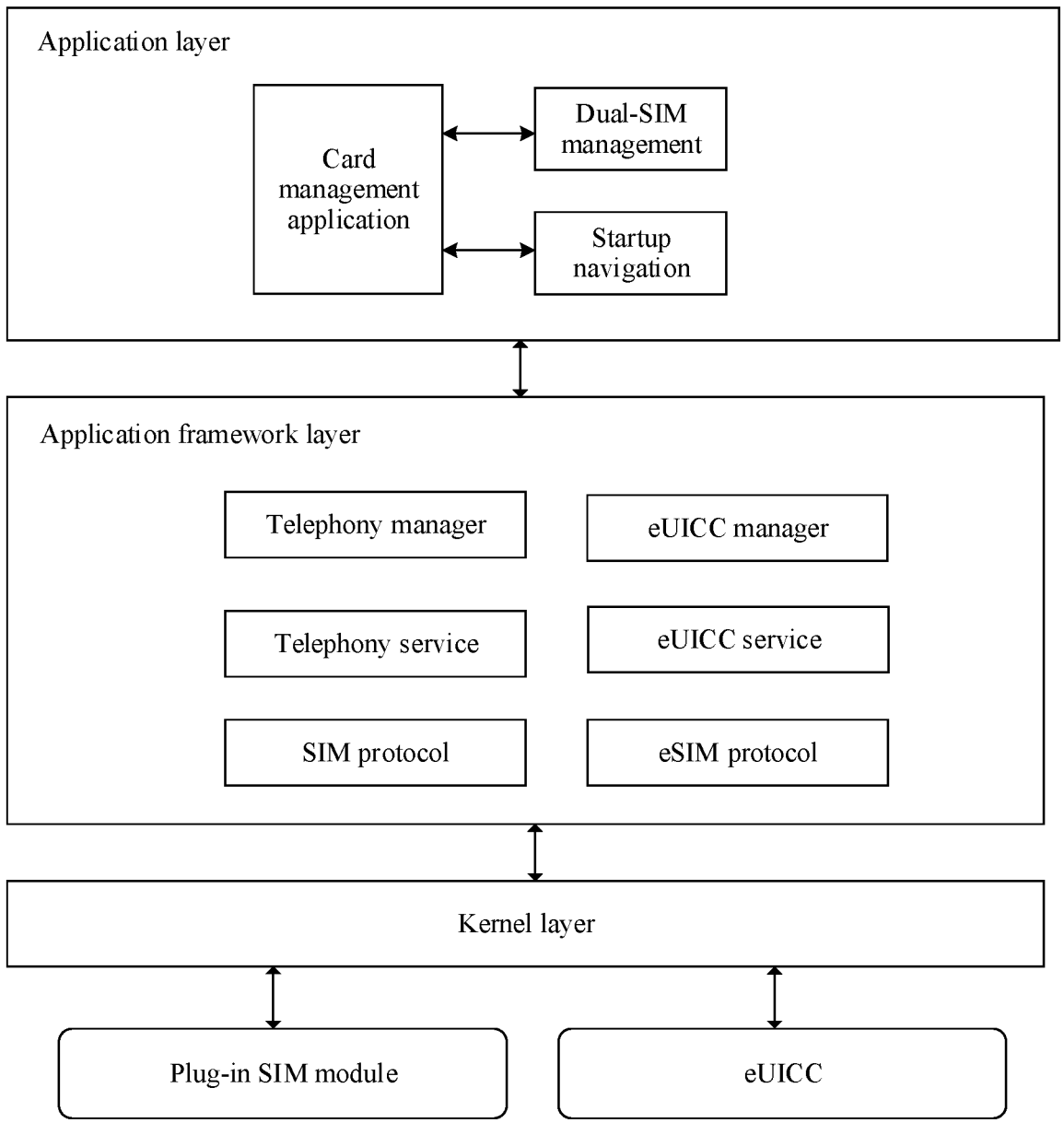
FIG. 5 is a schematic diagram of a software architecture composition of an electronic device according to an embodiment of this application.

FIG. 5 is a schematic diagram of a software architecture composition of an electronic device according to an embodiment of this application. In a layered architecture, software is divided into several layers, and each layer has a clear role and task. The layers communicate with each other through a software interface. In some embodiments, the Android system is divided into three layers: an application layer, an application framework (framework) layer, and a kernel layer from top to bottom.

The application layer may include a series of application packages. For example, the application package may include a card management application, Amazon, WeChat, Settings, Calculator, Camera, Phone, Messages, and the like.

As shown in FIG. 5, the card management application may provide various card management functions and corresponding management interfaces for a user. For example, the card management application may provide a SIM module management function and a corresponding interface for the user, so that the user can perform dual-SIM management, for example, set an eSIM module. For another example, during startup, the card management application may provide a startup navigation service and a corresponding interface for the user, so that the user may add an eSIM module during startup.

The application framework (framework) layer provides an application programming interface (application programming interface, API) and a programming framework for an application at the application layer. The framework is a runtime framework base of an electronic device. For example, in this embodiment of this application, the framework may include a telephony manager (telephony manager), a telephony service (telephony service), an eUICC manager (eUICC manager), and an eUICC service (eUICC service).

The telephony manager, the telephony service, the eUICC manager, and the eUICC service may provide an API related to a card operation for an upper-layer card management application. The upper-layer card management application may implement a corresponding card management function by invoking the API related to the card operation. For example, the card management application may invoke the related API based on settings of a plug-in SIM module by the user, and perform a corresponding configuration on the plug-in SIM module by using the telephony manager and the telephony service in cooperation with a SIM protocol (protocol). The card management application may further invoke the related API based on settings of an eSIM module by the user, and perform a corresponding configuration on the eSIM module by using the eUICC manager and the eUICC service in cooperation with an eSIM protocol (protocol). In this way, with reference to FIG. 2 or FIG. 3, when two SIM module interfaces (namely, the SIM module interface 1 and the SIM module interface 2) are both connected to a plug-in SIM module, and the eSIM module is activated, the electronic device may implement a three-SIM dual-standby function.

Certainly, with reference to FIG. 2 or FIG. 3, when neither of the two SIM module interfaces are connected to the plug-in SIM module, and only the eSIM module is activated, or when the SIM module interface 1 is connected to the plug-in SIM module, but the SIM module interface 2 is not connected to the plug-in SIM module, and the eSIM module is activated, or when the SIM module interface 2 is connected to the plug-in SIM module, but the SIM module interface 1 is not connected to the plug-in SIM module, and the eSIM module is activated, or when both the two SIM module interfaces are connected to the plug-in SIM module, but the eSIM module is not activated, or when either of the two SIM module interfaces is connected to the plug-in SIM module, and the eSIM module is not activated, the electronic device may also implement a corresponding function, so as to interact with a network.

The kernel layer is a layer between hardware and software. For example, in this embodiment of this application, the kernel layer is a layer between a hardware plug-in SIM module and the eUICC, and an upper-layer framework and the application layer. The kernel layer may include various drivers, such as a display driver, an audio driver, and the like.

In this embodiment, the card management application may further download an eSIM profile from an eSIM server (for example, subscription manager–data preparation+(subscription manager–data preparation+, SM–DP+)) based on a user operation, and invoke the related API to write the downloaded eSIM profile into the eUICC by using the eUICC manager and the eUICC service in cooperation with the eSIM protocol. The eSIM profile may be further updated. The eSIM profile may independently form a SIM application, that is, form the eSIM module.

All methods in the following embodiments may be implemented in an electronic device having the foregoing hardware structure and software architecture.

A SIM module management method provided in the embodiments of this application may be applied to an electronic device that supports dual plug-in SIM modules and an eSIM module. In the following embodiments, an example in which the electronic device is a mobile phone and a structural composition of the electronic device is shown in FIG. 2 is used for description. In the following embodiments, the SIM module interface 1 is a first SIM module interface in this application, the SIM module interface 2 is a second SIM module interface in this application, the plug-in SIM module 1 is a first plug-in SIM module in this application, and the plug-in SIM module 2 is a second plug-in SIM module in this application.

In some embodiments of this application, if a status of a SIM module (for example, the plug-in SIM module or the eSIM module) in the mobile phone changes, the mobile phone usually needs to perform card setting.

The mobile phone may determine that the status of the SIM module in the mobile phone changes when detecting that any one of the following cases occurs: a SIM module interface (for example, the SIM module interface 1 or the SIM module interface 2) changes from a state of not connecting to the plug-in SIM module to a state of connecting to the plug-in SIM module (or the plug-in SIM module is inserted into a SIM module interface), the SIM module interface changes from the state of connecting to the plug-in SIM module to the state of not connecting to the plug-in SIM module (or the plug-in SIM module is removed from the SIM module interface), the plug-in SIM module changes from an enabled state to a disabled state, the eSIM module changes from an enabled state to a disabled state, a new eSIM module is added and activated, or an original activated eSIM module is deleted.

For example, after a user inserts or removes the plug-in SIM module, the mobile phone may determine that the status of the SIM module in the mobile phone changes.

For example, when a SIM module interface (for example, the SIM module interface 1) is not connected to the plug-in SIM module, after the user inserts the plug-in SIM module 1 into the SIM module interface 1, the mobile phone detects that the SIM module interface 1 changes from the state of not connecting to the plug-in SIM module to the state of connecting to the plug-in SIM module. In this case, the mobile phone may determine that the status of the SIM module in the mobile phone changes.

For another example, when the SIM module interface 1 is connected to the plug-in SIM module 1, after the user removes the plug-in SIM module 1 from the SIM module interface 1, the mobile phone detects that the SIM module interface 1 changes from the state of connecting to the plug-in SIM module to the state of not connecting to the plug-in SIM module. In this case, the mobile phone may determine that the status of the SIM module in the mobile phone changes.

For another example, when the SIM module interface (for example, the SIM module interface 1 or the SIM module interface 2) is connected to the plug-in SIM module, the user may select to enable or disable the plug-in SIM module on a SIM module management interface. After the user selects to disable the plug-in SIM module on the SIM module management interface, the mobile phone may determine that the status of the SIM module changes.

Figure 6A:
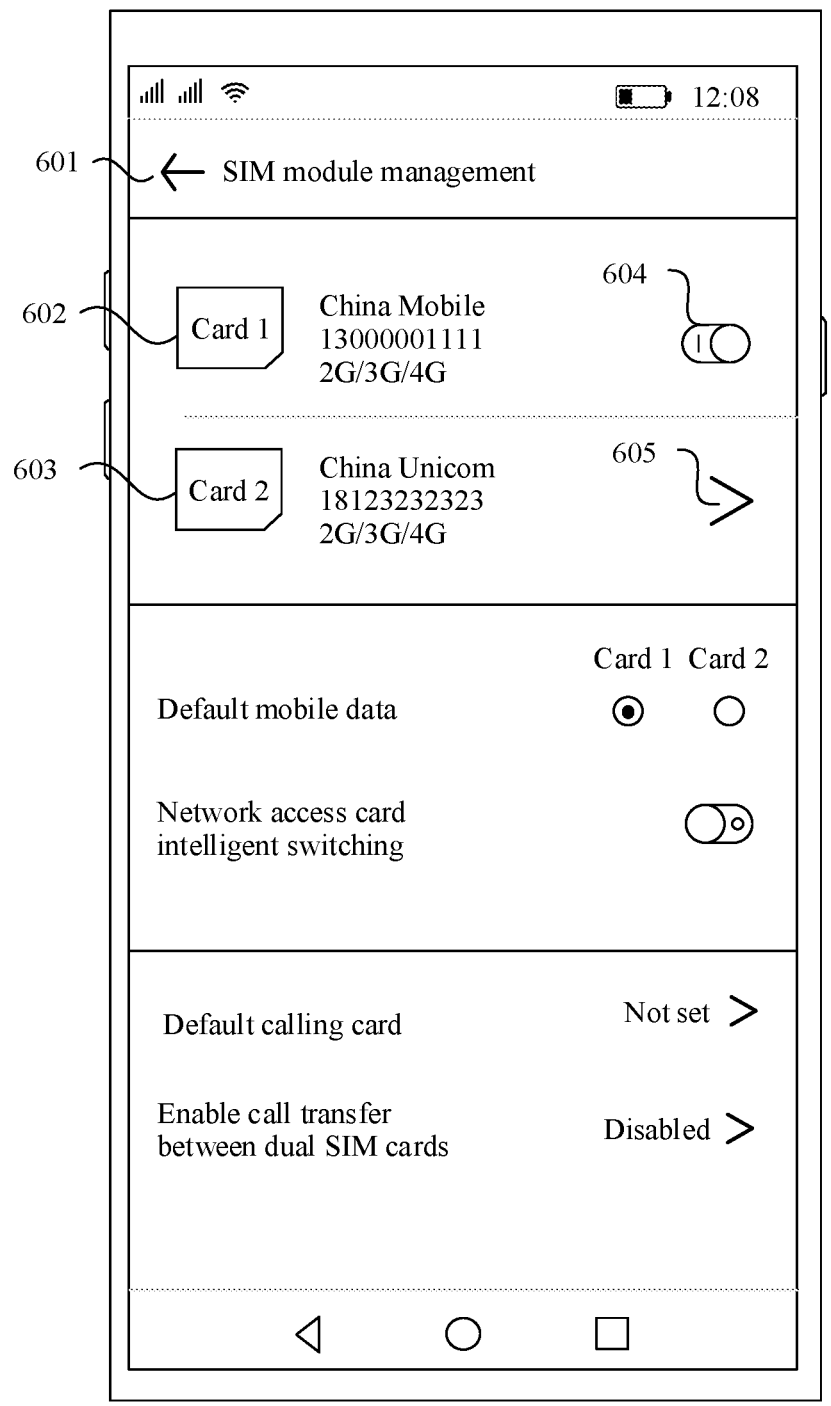
FIG. 6(a) and FIG. 6(b) are a schematic diagram of a SIM module management interface according to an embodiment of this application.

In an example, with reference to FIG. 2, it can be learned that, in hardware, the eSIM module (or the eUICC) is connected to the SIM module interface 2, that is, only one of the eSIM module and the plug-in SIM module 2 inserted into the SIM module interface 2 can be in online standby mode. For example, with reference to FIG. 2, based on a user selection, one of the SIM module interface 2 and the eSIM module may be controlled to be connected to a modem through cooperation of the SCI 1 and the SCI, so that one of the eSIM module and the plug-in SIM module 2 inserted into the SIM module interface 2 can be in online standby mode. Therefore, as shown in FIG. 6(a), on presentation of a SIM module management interface 601, an icon "card 1" 602 corresponds to the plug-in SIM module 1 inserted into the SIM interface 1, and a control such as a button 604 corresponding to the icon "card 1" 602 may be configured to set the plug-in SIM module 1. An icon "card 2" 603 corresponds to the eSIM module and the plug-in SIM module 2 inserted into the SIM interface 2, and a control such as a control 605 corresponding to the icon "card 2" 603 may be configured to set the plug-in SIM module 2 and the eSIM module.

For example, when the SIM module interface 1 is connected to the plug-in SIM module 1, as shown in FIG. 6(a), the user may perform a tap operation on the button 604 corresponding to the icon "card 1" 602 on the SIM module management interface 601, to enable or disable the plug-in SIM module 1. For example, on the SIM module management interface 601 shown in FIG. 6(a) (the SIM module management interface 601 may be a second interface in this application), a display state of the button 604 (the button 604 may be a third button in this application) is used to indicate that the plug-in SIM module 1 is currently in an enabled state. If the user wants to disable the plug-in SIM module 1, the user may perform a tap operation on the button 604. In response to the tap operation on the button 604, the mobile phone changes the plug-in SIM module 1 from the enabled state to a disabled state. In addition, when detecting that the plug-in SIM module 1 changes from the enabled state to the disabled state, the mobile phone may determine that the status of the SIM module in the mobile phone changes. After the plug-in SIM module 1 changes to the disabled state, the mobile phone cannot connect to the network through the plug-in SIM module 1, that is, the user cannot make a call or access the internet by using the plug-in SIM module 1. The mobile phone may further change a display status (not shown in the figure) of the button 604, and a changed display state is used to indicate that the plug-in SIM module 1 is in the disabled state. In addition, if the user wants to re-enable the plug-in SIM module 1, the user may perform the tap operation on the button 604 again. In response to the tap operation on the button 604 again by the user, the mobile phone changes the plug-in SIM module 1 from the disabled state to the enabled state.

Figure 6B:
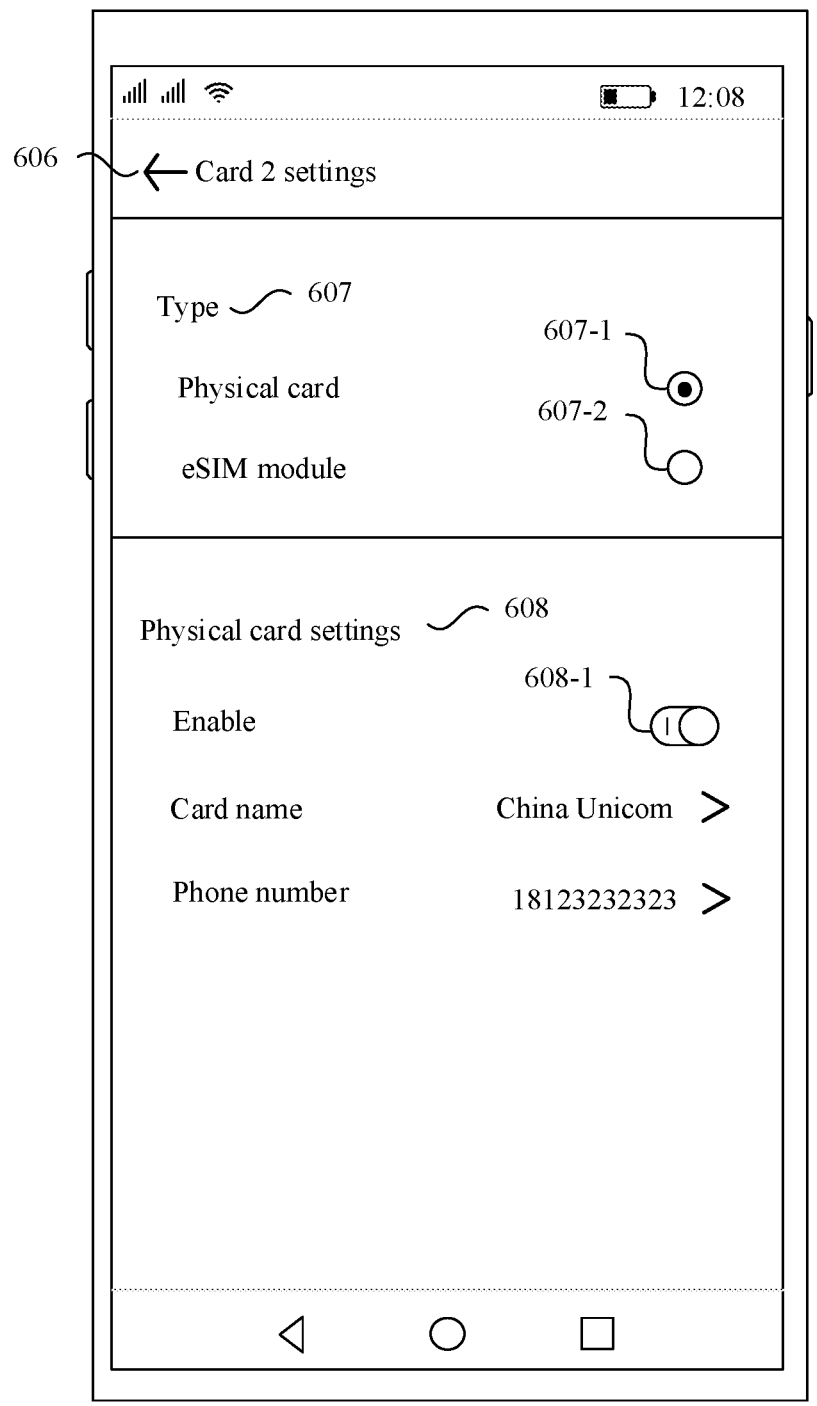

For another example, when the SIM module interface 2 is connected to the plug-in SIM module 2, as shown in FIG. 6(a), the user may perform a tap operation on the control 605 corresponding to the icon "card 2" 603 on the SIM module management interface 601. As shown in FIG. 6(b), in response to the tap operation on the control 605, the mobile phone may display a card 2 settings interface 606 (the card 2 settings interface 606 may be a first interface in this application). The card 2 settings interface 606 includes a "type" option 607. The "type" option 607 may be used by the user to select one of the SIM module 2 and the eSIM module to be in online standby mode. For example, the user may select one of the plug-in SIM module 2 and the eSIM module to be in online standby mode by selecting a button 607-1 or a button 607-2 (the button 607-1 may be a first button in this application, and the button 607-2 may be a second button in this application). For example, with reference to FIG. 2, if the user selects the button 607-1 and does not select the button 607-2, based on the user selection, the mobile phone controls the SIM module interface 2 to be connected to the modem through cooperation of the SCI 1 and the SCI, so that the plug-in SIM module 2 inserted into the SIM module interface 2 is in online standby mode. For another example, with reference to FIG. 2, if the user does not select the button 607-1 and selects the button 607-2, based on the user selection, the mobile phone controls the eSIM module to be connected to the modem through cooperation of the SCI 1 and the SCI, so that the eSIM module is in online standby mode.

Figure 7A:
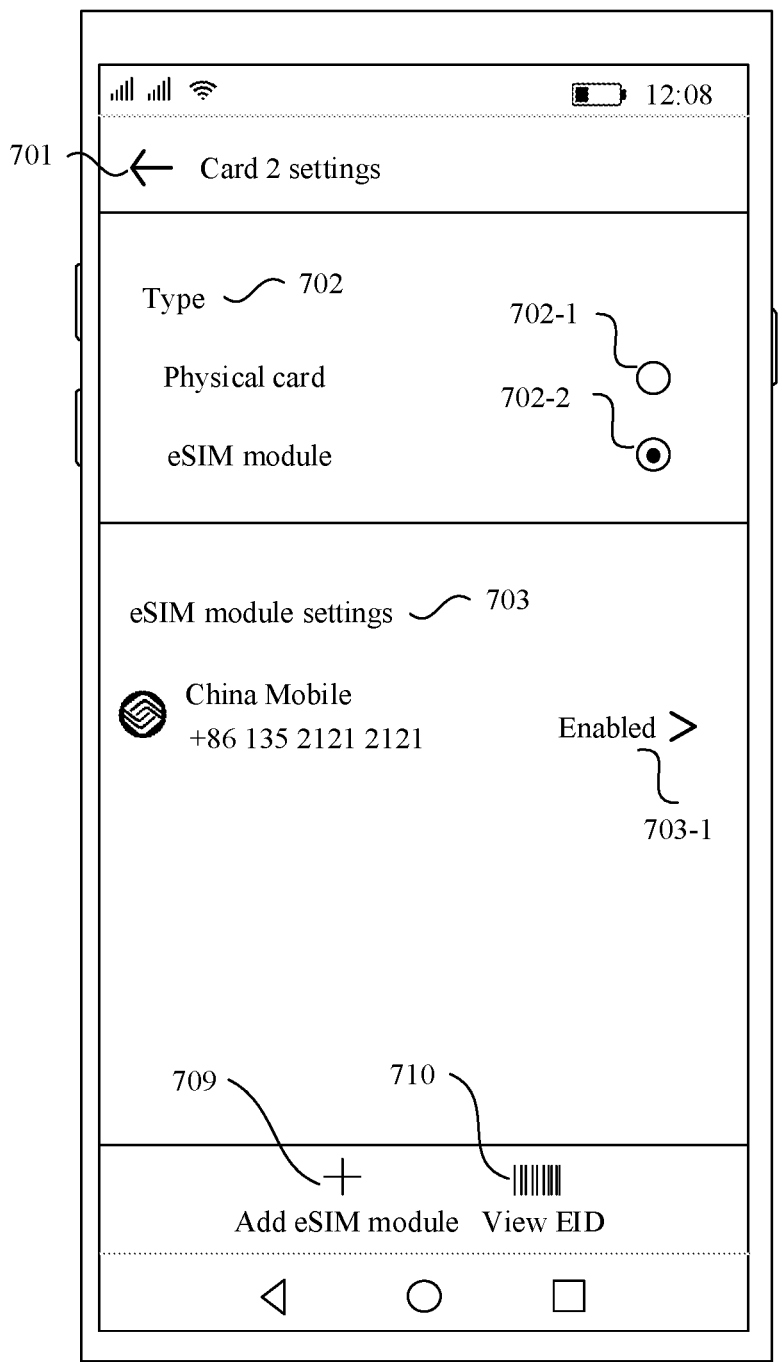
FIG. 7(a) to FIG. 7(d) are a schematic diagram of another SIM module management interface according to an embodiment of this application.
Figure 7B:
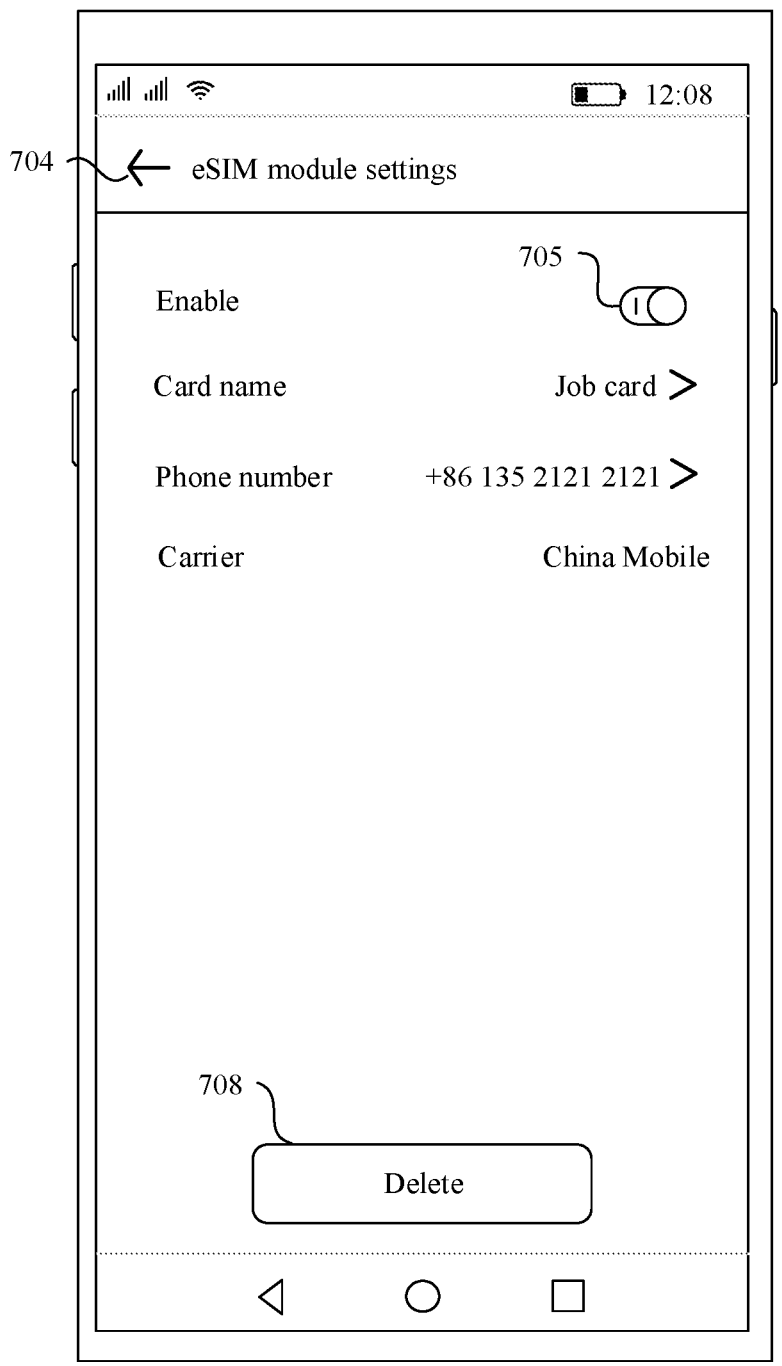
Figure 7C:
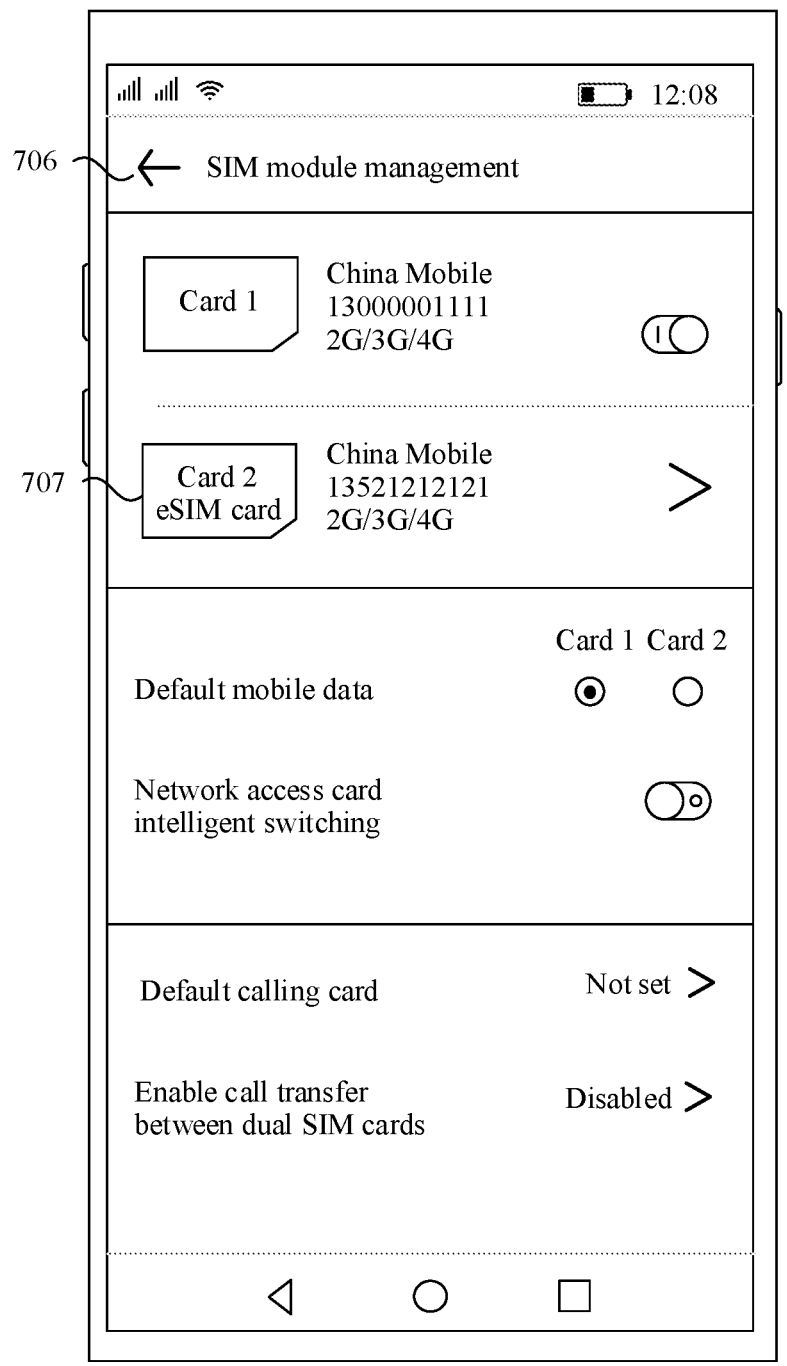
Figure 7D:
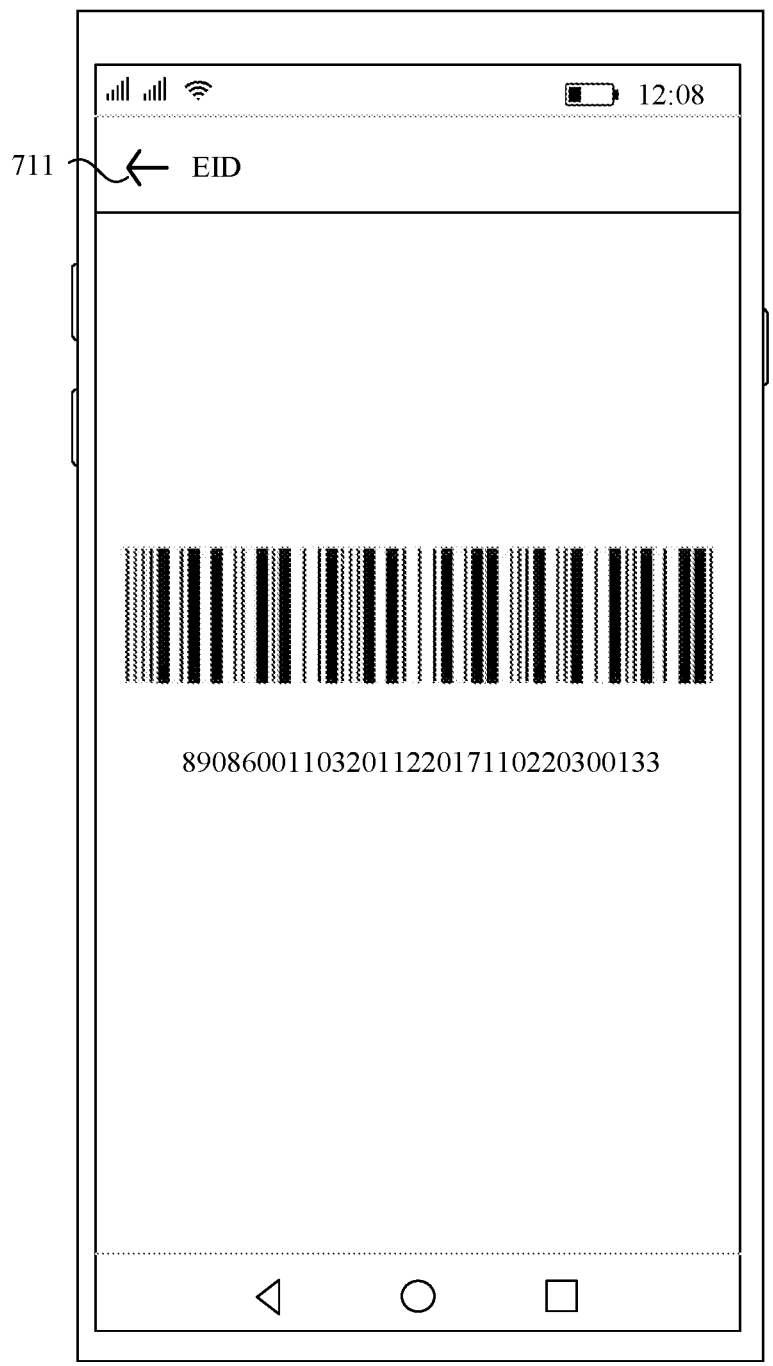

It should be noted that FIG. 6(b) is an interface shown by using an example in which the plug-in SIM module 2 inserted into the SIM module interface 2 is in online standby mode by default, that is, the SIM module interface 2 is connected to the modem by default. That is, this example is illustrated by using an example in which the mobile phone displays the card 2 settings interface 606 shown in FIG. 6(b) in response to the tap operation on the control 605. In some other embodiments, the eSIM module may also be in online standby mode by default, that is, the eSIM module is connected to the modem by default. In this case, in response to the tap operation on the control 605, the mobile phone may display a card 2 settings interface 701 shown in FIG. 7(a). In addition, in the embodiments, the card 2 settings interface 606 shown in FIG. 6(b) is used as an example of a lower-level interface of the SIM module management interface 601 shown in FIG. 6(a). In some other embodiments, content included in the card 2 settings interface 606 may also be included on the SIM module management interface 601. In this implementation, the content included in the card 2 settings interface 606 may be temporarily hidden from display, and displayed after an operation of the user is received. For example, after receiving the tap operation of the user on the control 605 corresponding to the icon "card 2" 603, the mobile phone displays a display menu on the SIM module management interface 601. The menu includes the content included on the card 2 settings interface 606. The content included in the card 2 settings interface 606 may also be directly displayed on the SIM module management interface 601.

For example, the plug-in SIM module 2 is currently in online standby mode. On the card 2 settings interface 606, the button 607-1 of the "type" option 607 is selected, and the button 607-2 is not selected, which is used to indicate that the plug-in SIM module 2 is currently in online standby mode. When the button 607-1 is selected and the button 607-2 is not selected, with reference to FIG. 2, the mobile phone may control the SIM module interface 2 to be connected to the modem through cooperation of the SCI 1 and the SCI, so that the plug-in SIM module 2 is in online standby mode.

The card 2 settings interface 606 further includes a "physical card setting" option 608. The "physical card setting" option 608 may be used by the user to perform related settings on the plug-in SIM module 2. For example, the user may perform a tap operation on a button 608-1 (the button 608-1 may be a fourth button in this application) included in the "physical card setting" option 608, to enable or disable the plug-in SIM module 2. After receiving the tap operation of the user on the button 608-1, the mobile phone may change the plug-in SIM module 2 from the enabled state to the disabled state, or from the disabled state to the enabled state. When the button 607-1 is selected and the button 607-2 is not selected, the SIM module 2 may be in the enabled state by default. When detecting that the plug-in SIM module 2 changes from the enabled state to the disabled state, the mobile phone may determine that the status of the SIM module in the mobile phone changes. Specific descriptions of enabling or disabling the plug-in SIM module 2 are similar to related descriptions of enabling or disabling the plug-in SIM module 1 in the foregoing example. Details are not described herein again. In addition, the "physical card setting" option 608 may further provide setting options for a card name and a SIM module number of the plug-in SIM module 2. The user may set the card name and the SIM module number of the plug-in SIM module 2 through the corresponding setting options.

For another example, when the eSIM module is in online standby mode, the user may alternatively select to enable or disable the eSIM module. After the user selects to enable or disable the eSIM module, a status of the eSIM module changes accordingly. When detecting that the eSIM module changes from the enabled state to the disabled state, the mobile phone may determine that the status of the SIM module in the mobile phone changes.

For example, refer to FIG. 7(*a*) to FIG. 7(*d*). As shown in FIG. 7(*a*), the eSIM module is in online standby mode is used as an example. In the card 2 settings interface 701 (the card 2 settings interface 701 may be the first interface in this application), a button 702-1 of a "type" option 702 is not selected, and a button 702-2 is selected (the button 702-1 may be the first button in this application, and the button 702-2 may be the second button in this application), which is used to indicate that the eSIM module is currently in online standby mode. For example, the user may select the button 607-2 on the interface shown in FIG. 6(*b*), and in response to the operation of the user, the mobile phone may display the card 2 settings interface 701 shown in FIG. 7(*a*). When the button 702-1 is not selected and the button 702-2 is selected, with reference to FIG. 2, the mobile phone may control the eSIM module to be connected to the modem through cooperation of the SCI 1 and the SCI, so that the eSIM module is in online standby mode.

The card 2 settings interface 701 further includes an "eSIM module setting" option 703, which is used by the user to perform related settings on the eSIM module. For example, the user may tap a button 703-1 included in the "eSIM module setting" option 703. As shown in FIG. 7(*b*), in response to the tap operation on the button 703-1, the mobile phone displays an eSIM module settings interface 704. The eSIM module settings interface 704 may be used by the user to perform related settings on the eSIM module. For example, the user may perform a tap operation on a button 705 (the button 705 may be a fifth button in this application) included on the eSIM module settings interface 704 (the eSIM module settings interface 704 may be a fourth interface in this application), to enable or disable the eSIM module. When the button 702-1 is not selected and the button 702-2 is selected, the eSIM module may be in the enabled state by default. After receiving the tap operation of the user on the button 705, the mobile phone may change the eSIM module from the enabled state to the disabled state, or from the disabled state to the enabled state. When detecting that the eSIM module changes from the enabled state to the disabled state, the mobile phone may determine that the status of the SIM module in the mobile phone changes. Specific descriptions of enabling or disabling the eSIM module are similar to related descriptions of enabling or disabling the plug-in SIM module 1 in the foregoing example. Details are not described herein again. In addition, the eSIM module settings interface 704 may further provide setting options for a card name and a card number of the eSIM module. The user may set the card name and the card number of the eSIM module through the corresponding setting options.

The card 2 settings interface 701 may further include an EID view button 710. When the user wants to view an EID of the eUICC that stores the eSIM profile corresponding to the eSIM module, the user may tap the EID view button 710. As shown in FIG. 7(*d*), in response to the tap operation on the EID view button 710, the mobile phone may display an interface 711. The interface 711 includes the EID.

In addition, in some embodiments, when the eSIM module is selected to be in online standby mode, in order to enable the user to learn that the eSIM module is currently selected, compared with the SIM module management interface 601 shown in FIG. 6(*a*), on a SIM module management interface 706 shown in FIG. 7(*c*), an icon "card 2" 707 corresponding to the eSIM module and the plug-in SIM module 2 inserted into the SIM interface 2 includes a word "eSIM card".

For another example, the user may further add a new eSIM module to the mobile phone and activate the new eSIM module, or delete an original activated eSIM module. After the user adds the new eSIM module to the mobile phone and activates the new eSIM module, or deletes the original activated eSIM module, the mobile phone may determine that the status of the SIM module changes. The added and activated new eSIM module may be a second eSIM module in this application. The original activated eSIM module may be a first eSIM module in this application.

For example, for the original activated eSIM module in the mobile phone, if the user wants to delete the eSIM module, as shown in FIG. 7(*b*), the user may tap a delete button 708. In response to the tap operation on the delete button 708, the mobile phone may delete the eSIM module from the mobile phone. When detecting that the original activated eSIM module is deleted, the mobile phone may determine that the status of the SIM module in the mobile phone changes.

Figure 8A:
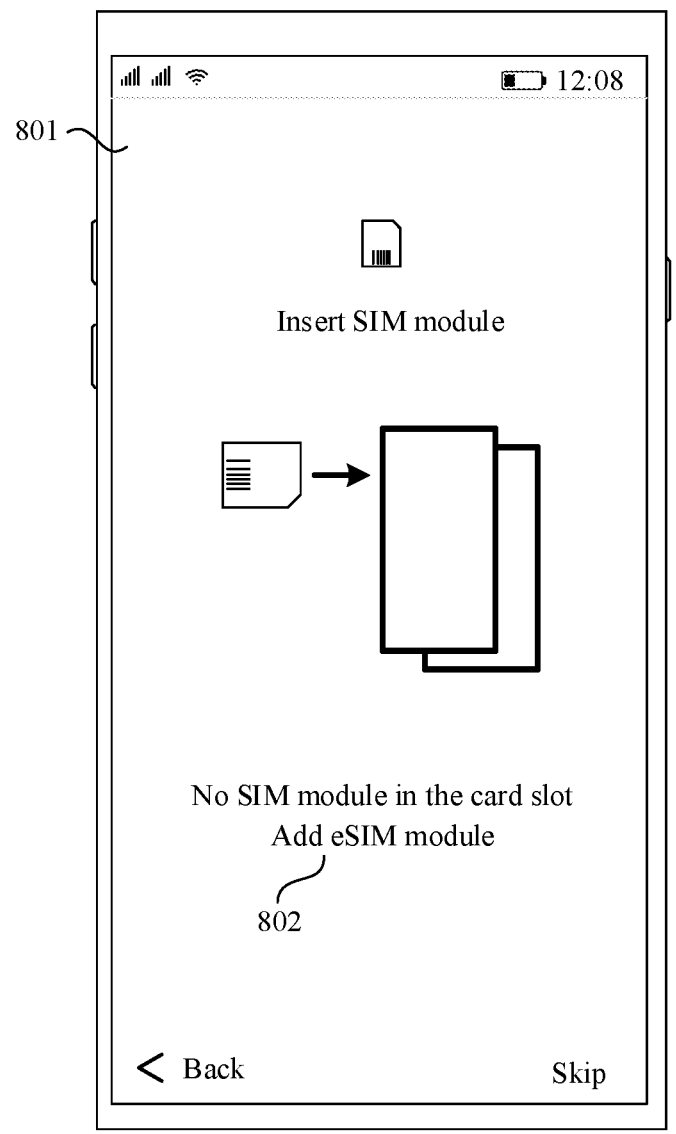
FIG. 8(a) to FIG. 8(f) are a schematic diagram of still another SIM module management interface according to an embodiment of this application.
Figure 8B:
Figure 8C:
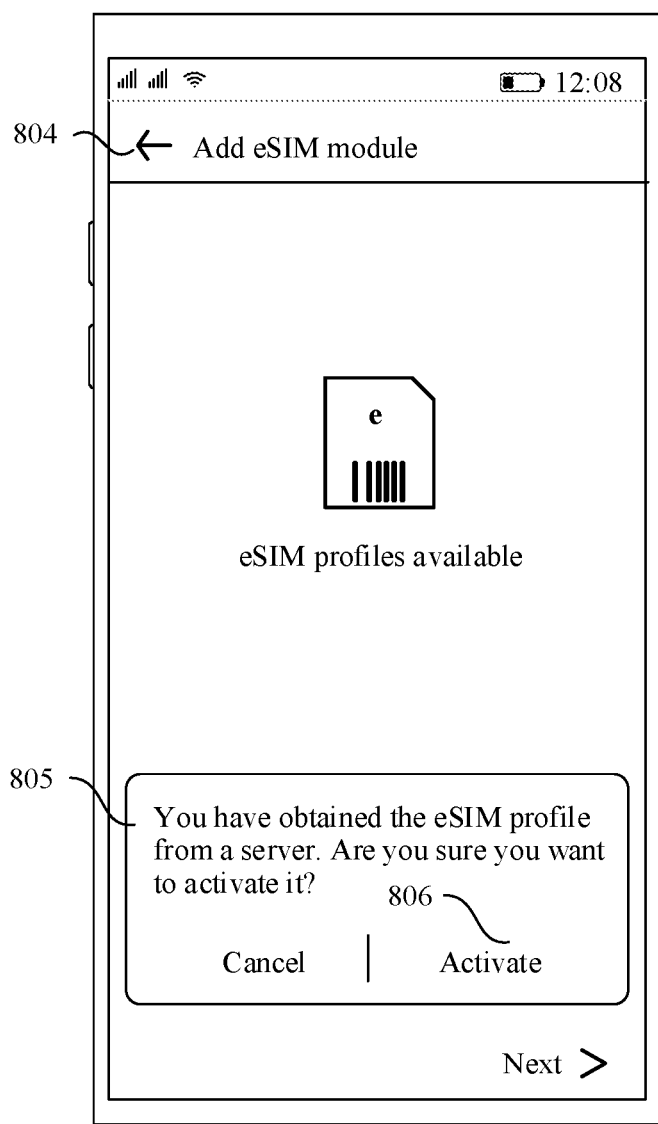
Figure 8D:
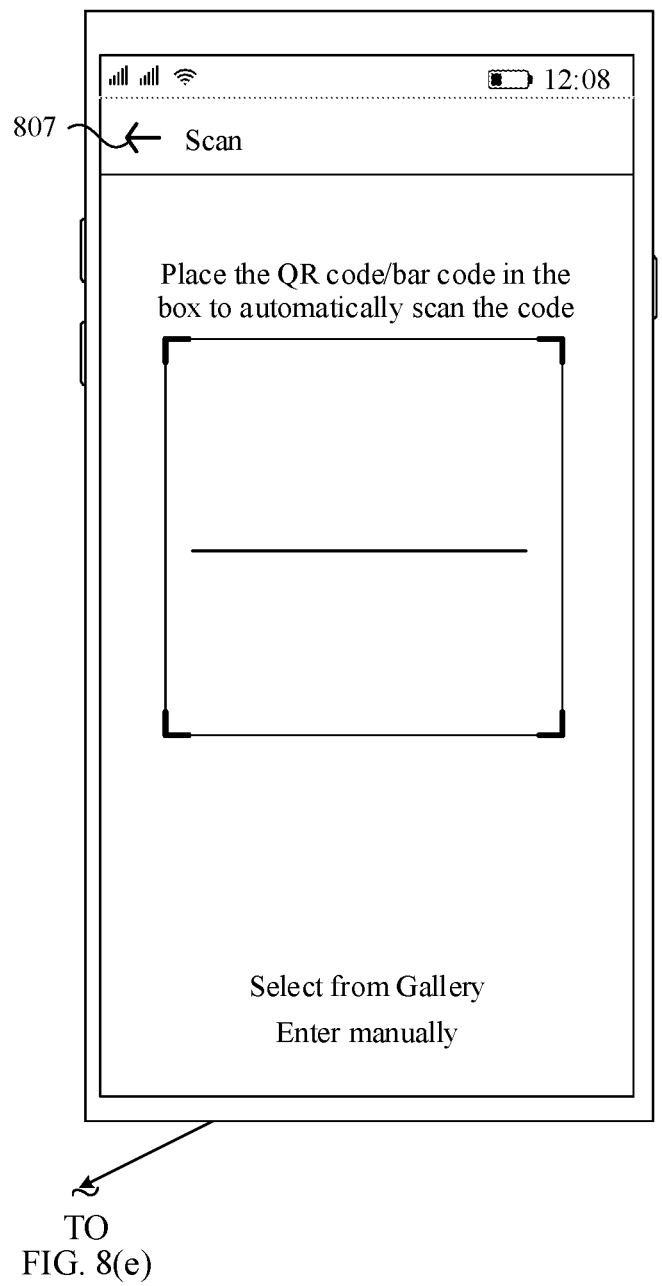
Figure 8E:
Figure 8F:
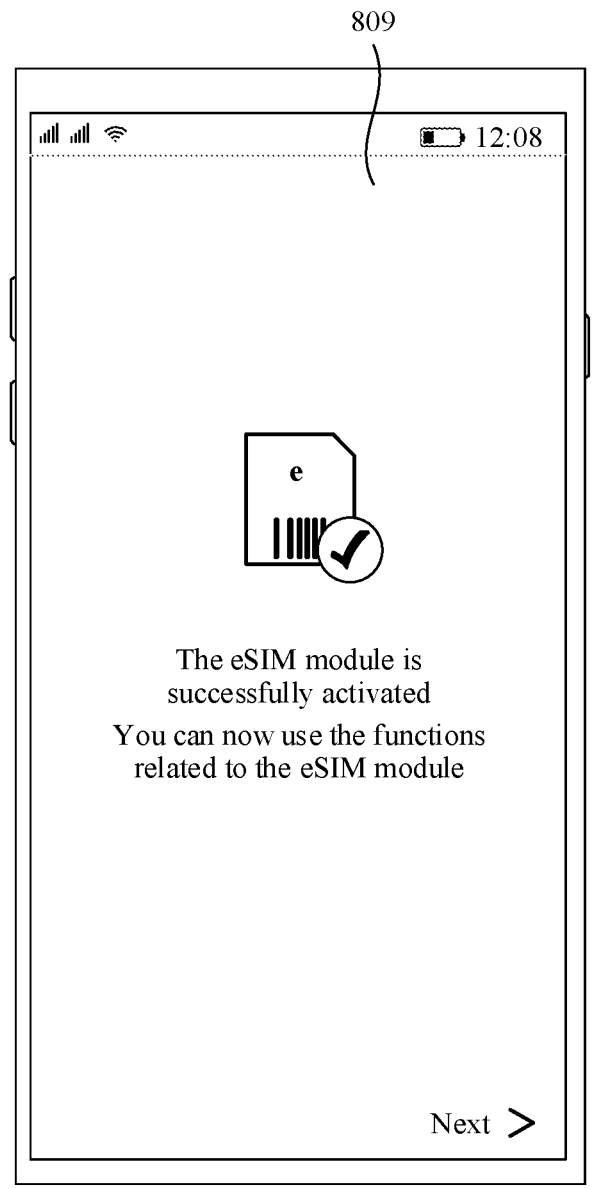

For another example, if the user wants to add the new eSIM module to the mobile phone, as shown in FIG. 7(*a*), the user may tap an add button 709, or during first startup, the mobile phone may provide an entry for adding an eSIM module in a startup wizard process. That is, as shown in FIG. 8(*a*), the user may tap an add eSIM module button 802 on a startup wizard interface 801. In response to the tap operation on the add button 709 or the add eSIM module button 802, as shown in FIG. 8(*b*), the mobile phone queries whether there is an available eSIM profile, and may display a waiting interface 803 for adding an eSIM module. If the mobile phone finds that there is an available eSIM profile, as shown in FIG. 8(*c*), an interface 804 may be displayed, and a prompt box 805 is displayed. The prompt box 805 is used to prompt the user that an available eSIM profile has been found, and ask the user whether to activate the eSIM profile. In this case, the user may tap a direct activate button 806. In response to the tap operation of the user on the direct activate button 806, the mobile phone may activate the eSIM profile. As shown in FIG. 8(*e*), the mobile phone may further display a waiting interface 808 for activating the eSIM module. If the mobile phone finds that there is no available eSIM profile, a camera of the mobile phone may be turned on, and as shown in FIG. 8(d), a scanning interface 807 is displayed, so that the user scans, by using the mobile phone, a corresponding QR code provided by a carrier to obtain the eSIM profile from a server of the carrier. Alternatively, the user can select a QR code saved in a gallery or manually enter a corresponding number, so that the mobile phone obtains the eSIM profile. After obtaining the eSIM profile, the mobile phone may activate the eSIM profile. As shown in FIG. 8(e), the mobile phone may alternatively display the waiting interface 808 for activating the eSIM module. After the eSIM profile is successfully activated, as shown in FIG. 8(f), the mobile phone may display a prompt interface 809, to prompt the user that the new eSIM module has been successfully added and related functions of the new eSIM module can be used. In addition, when detecting that the new eSIM module is successfully added and activated, the mobile phone may determine that the status of the SIM module in the mobile phone changes.

After the mobile phone determines that the status of the SIM module in the mobile phone changes, the mobile phone may perform card setting. In the embodiments, that the mobile phone performs card setting may be specifically: The mobile phone sets a primary card and a secondary card. In some embodiments, a SIM module set as the primary card may be used by the mobile phone to transmit mobile data, and a SIM module set as the secondary card cannot be used by the mobile phone to transmit mobile data. In some other embodiments, both the SIM module set as the primary card and the SIM module set as the secondary card may be used by the mobile phone to transmit mobile data, and the SIM module set as the primary card is preferably used. For example, when a network condition of the SIM module set as the primary card is good, the mobile phone uses the SIM module set as the primary card to transmit mobile data; and when a network condition of the SIM module set as the primary card is relatively poor, the mobile phone uses the SIM module set as the secondary card to transmit mobile data.

In some embodiments, an example in which the user inserts the plug-in SIM module into the SIM module interface, that is, the SIM module interface (such as the SIM module interface 1 or the SIM module interface 2) changes from the state of not connecting to the plug-in SIM module to the state of connecting to the plug-in SIM module is used. After the user inserts the plug-in SIM module into the SIM module interface, the mobile phone may determine that the status of the SIM module in the mobile phone changes. The mobile phone obtains card information of the SIM module whose status changes, and checks an activation status of the eSIM module in the mobile phone, so as to perform card setting based on the obtained card information and the activation status of the activated eSIM module in the mobile phone.

The card information may include a card type and a card identifier. The card type may be the plug-in SIM module or the eSIM module, and the card identifier may be an ICCID of a SIM module (for example, the plug-in SIM module or the eSIM module).

For example, with reference to FIG. 2, an example in which the user inserts the plug-in SIM module 1 into the SIM module interface 1 is used. After the user inserts the plug-in SIM module 1 into the SIM module interface 1, the mobile phone may determine that the status of the SIM module in the mobile phone changes. The mobile phone obtains a card type and a card identifier of the SIM module whose status changes. For example, if the obtained card type is the plug-in SIM module, an ICCID is an ICCID 1. The ICCID 1 is an ICCID of the plug-in SIM module 1.

The mobile phone may further check an activation status of the eSIM module in the mobile phone, to determine whether the mobile phone activates the eSIM module.

For example, the mobile phone may determine, based on a quantity of activated eSIM profiles in the mobile phone, whether the mobile phone activates the eSIM module. If the quantity of activated eSIM profiles in the mobile phone is 0, the mobile phone may determine that the mobile phone does not activate the eSIM module. If the quantity of activated eSIM profiles in the mobile phone is not 0, the mobile phone may determine that the mobile phone activates the eSIM module.

In the embodiments of this application, the mobile phone may obtain the quantity of activated eSIM profiles in the mobile phone based on a card status of the eSIM module recorded in the mobile phone. With reference to FIG. 5, the card status, the card type, the ICCID, and the like of the eSIM module may be recorded in the mobile phone after the kernel layer reports an SIM SLOT STATUS CHANGED event, and then the application framework layer of the mobile phone queries card account information.

If the mobile phone does not activate the eSIM module, the mobile phone may obtain a quantity of plug-in SIM modules inserted into the mobile phone. If only one plug-in SIM module is inserted into the mobile phone, for example, only the plug-in SIM module 1 is inserted into the mobile phone, the mobile phone may set the plug-in SIM module 1 as the primary card. If two plug-in SIM modules are inserted into the mobile phone, that is, both the plug-in SIM module 1 and the plug-in SIM module 2 are inserted into the mobile phone, the mobile phone may determine, based on an obtained card type and card identifier, whether the newly inserted plug-in SIM module 1 is previously set by the user as the primary card. If the plug-in SIM module 1 is previously set by the user as the primary card, the mobile phone sets the plug-in SIM module 1 as the primary card, and sets the plug-in SIM module 2 as the secondary card. If the plug-in SIM module 1 is not previously set by the user as the primary card, the mobile phone performs card setting based on SIM module interfaces connected to the plug-in SIM module 1 and the plug-in SIM module 2. For example, if the plug-in SIM module 1 is connected to the SIM module interface 1, the plug-in SIM module 2 is connected to the SIM module interface 2, and the SIM module interface 1 is a primary card slot, the mobile phone sets the plug-in SIM module 1 as the primary card, and sets the plug-in SIM module 2 as the secondary card. For another example, if the plug-in SIM module 1 is connected to the SIM module interface 1, the plug-in SIM module 2 is connected to the SIM module interface 2, and the SIM module interface 2 is the primary card slot, the mobile phone sets the plug-in SIM module 2 as the primary card, and sets the plug-in SIM module 1 as the secondary card. The primary card slot may refer to that a SIM module connected to the primary card slot previously (for example, last time) is set as the primary card by the user.

If the mobile phone activates the eSIM module, that is, the mobile phone has both the plug-in SIM module 1 and the eSIM module in position, the mobile phone may perform card setting based on a result of whether the newly inserted plug-in SIM module 1 is previously set by the user as the primary card. A specific setting manner is similar to a card setting manner when the eSIM module is not activated in the mobile phone and both the plug-in SIM module 1 and the plug-in SIM module 2 are inserted into the mobile phone. Details are not described herein again.

An example in which the user inserts the plug-in SIM module 2 into the SIM module interface 2 is used. After the user inserts the plug-in SIM module 2 into the SIM module interface 2, the mobile phone may determine that the status of the SIM module in the mobile phone changes. The mobile phone obtains a card type and a card identifier of the SIM module whose status changes. For example, if the obtained card type is the plug-in SIM module, the ICCID is an ICCID 2. The ICCID 2 is an ICCID of the plug-in SIM module 2.

The mobile phone may further check the activation status of the eSIM module in the mobile phone, to determine whether the mobile phone activates the eSIM module. If the mobile phone does not activate the eSIM module, a description in which the mobile phone performs card setting is similar to the description in which the plug-in SIM module 1 is inserted and the mobile phone does not activate the eSIM module. Details are not described herein again. If the mobile phone activates the eSIM module, the mobile phone may perform card setting based on a user selection. For example, when no plug-in SIM module is inserted into the SIM module interface 1, the mobile phone prompts the user that the eSIM module exists and whether to use the plug-in SIM module 2. If the user selects to use the plug-in SIM module 2, the eSIM module may be deactivated and the plug-in SIM module 2 may be set as the primary card. If the user selects not to use the plug-in SIM module 2, the eSIM module may continue to be set as the primary card. For another example, when the plug-in SIM module 1 is inserted into the SIM module interface 1, and the plug-in SIM module 1 is set as the primary card, the mobile phone prompts the user that the eSIM module exists and whether to use the plug-in SIM module 2. If the user selects to use the plug-in SIM module 2, the eSIM module may be deactivated and the plug-in SIM module 2 may be set as the secondary card. If the user selects not to use the plug-in SIM module 2, the eSIM module may continue to be set as the secondary card. For another example, when the plug-in SIM module 1 is inserted into the SIM module interface 1, and the plug-in SIM module 1 is set as the secondary card, the mobile phone prompts the user that the eSIM module exists and whether to use the plug-in SIM module 2. If the user selects to use the plug-in SIM module 2, the eSIM module may be deactivated and the plug-in SIM module 2 may be set as the primary card. If the user selects not to use the plug-in SIM module 2, the eSIM module may continue to be set as the primary card.

In some other embodiments, an example in which the eSIM module is newly installed and activated is used. After the user newly installs the eSIM module in the mobile phone and the mobile phone activates the eSIM module, the mobile phone may determine that the status of the SIM module in the mobile phone changes. The mobile phone obtains card information of the SIM module whose status changes, and determines whether the plug-in SIM module is inserted into the SIM module interface 1, so as to perform card setting based on the obtained card information and a result of whether the plug-in SIM module is inserted into the SIM module interface 1.

For example, with reference to FIG. 2, after the user newly installs the eSIM module in the mobile phone and the mobile phone activates the eSIM module, the mobile phone may determine that the status of the SIM module in the mobile phone changes. The mobile phone obtains a card type and a card identifier of the SIM module whose status changes. For example, if the obtained card type is the eSIM module, the ICCID is the ICCID 2. The ICCID 2 is an ICCID of the eSIM module.

The mobile phone may further determine whether the plug-in SIM module is inserted into the SIM module interface 1. If no plug-in SIM module is inserted into the SIM module interface 1, the mobile phone sets the eSIM module as the primary card. If the plug-in SIM module such as the plug-in SIM module 1 is inserted into the SIM module interface 1, the mobile phone may determine, based on the obtained card type and card identifier, whether the eSIM module is previously set by the user as the primary card. If the eSIM module is previously set by the user as the primary card, the mobile phone sets the eSIM module as the primary card, and sets the plug-in SIM module 1 as the secondary card. If the eSIM module is not previously set by the user as the primary card, the mobile phone performs card setting based on SIM module interfaces connected to the plug-in SIM module 1 and the eSIM module. For example, if the plug-in SIM module 1 is connected to the SIM module interface 1, the eSIM module is connected to the SIM module interface 2, and the SIM module interface 1 is the primary card slot, the mobile phone sets the plug-in SIM module 1 as the primary card, and sets the eSIM module as the secondary card. For another example, if the plug-in SIM module 1 is connected to the SIM module interface 1, the eSIM module is connected to the SIM module interface 2, and the SIM module interface 2 is the primary card slot, the mobile phone sets the eSIM module as the primary card, and sets the plug-in SIM module 1 as the secondary card.

In some other embodiments, an example in which the user removes the plug-in SIM module from the SIM module interface, that is, the SIM module interface (such as the SIM module interface 1 or the SIM module interface 2) changes from the state of connecting to the plug-in SIM module to the state of not connecting to the plug-in SIM module is used. After the user removes the plug-in SIM module from the SIM module interface, the mobile phone may determine that the status of the SIM module in the mobile phone changes. The mobile phone checks the activation status of the eSIM module in the mobile phone, and obtains a status of the plug-in SIM module inserted into the mobile phone, so as to perform card setting based on the activation status of the activated eSIM module in the mobile phone and the status of the plug-in SIM module inserted into the mobile phone.

For example, with reference to FIG. 2, an example in which the user removes the plug-in SIM module 1 from the SIM module interface 1 is used. After the user removes the plug-in SIM module 1 from the SIM module interface 1, the mobile phone may determine that the status of the SIM module in the mobile phone changes.

If the plug-in SIM module 1 is currently set as the secondary card, no card setting is performed.

If the plug-in SIM module 1 is currently set as the primary card, the mobile phone may check the activation status of the eSIM module in the mobile phone, to determine whether the mobile phone activates the eSIM module. If the mobile phone does not activate the eSIM module, the mobile phone may determine whether the plug-in SIM module is inserted into the SIM module interface 2. If the plug-in SIM module such as the plug-in SIM module 2 is inserted into the SIM module interface 2, the mobile phone may set the plug-in SIM module 2 as the primary card. If the mobile phone activates the eSIM module, the mobile phone may determine whether the plug-in SIM module is inserted into the SIM module interface 2. If no plug-in SIM module is inserted into the SIM module interface 2, the mobile phone may set the eSIM module as the primary card. If the plug-in SIM module such as the plug-in SIM module 2 is inserted into the SIM module interface 2, the mobile phone may set a SIM module in online standby mode as the primary card based on a current setting of the user. For example, if the user currently selects the plug-in SIM module 2 to be in online standby mode, the mobile phone sets the plug-in SIM module 2 as the primary card. For another example, if the user currently selects the eSIM module to be in online standby mode, the mobile phone sets the eSIM module as the primary card. For details about how the user selects one of the plug-in SIM module 2 and the eSIM module to be in online standby mode, refer to descriptions of corresponding content in the example shown in FIG. 6(*a*) and FIG. 6(*b*).

For another example, with reference to FIG. 2, an example in which the user removes the plug-in SIM module 2 from the SIM module interface 2 is used. After the user removes the plug-in SIM module 2 from the SIM module interface 2, the mobile phone may determine that the status of the SIM module in the mobile phone changes.

If the plug-in SIM module 2 is currently set as the secondary card, no card setting is performed.

If the plug-in SIM module 2 is currently set as the primary card, the mobile phone may check the activation status of the eSIM module in the mobile phone, to determine whether the mobile phone activates the eSIM module. If the mobile phone does not activate the eSIM module, the mobile phone may determine whether the plug-in SIM module is inserted into the SIM module interface 1. If the plug-in SIM module such as the plug-in SIM module 1 is inserted into the SIM module interface 1, the mobile phone sets the plug-in SIM module 1 as the primary card. If the mobile phone activates the eSIM module, the mobile phone sets the eSIM module as the primary card.

In addition, if the plug-in SIM module removed by the user is currently set as the primary card, after the user removes the plug-in SIM module, the mobile phone may further obtain card information (the card information may include a card type and a card identifier) of the removed plug-in SIM module, and record the obtained card information. After the plug-in SIM module is subsequently re-inserted into the SIM module interface, the mobile phone may set the plug-in SIM module as the primary card based on the recorded card information.

In some other embodiments, an example in which the user deletes the original activated eSIM module is used. After the user deletes the original activated eSIM module, the mobile phone may determine that the status of the SIM module in the mobile phone changes. The mobile phone obtains a status of the plug-in SIM module inserted into the mobile phone, to perform card setting based on the status of the inserted plug-in SIM module.

For example, with reference to FIG. 2, after the user deletes the original activated eSIM module, the mobile phone may determine that the status of the SIM module in the mobile phone changes.

If the eSIM module is not selected as the SIM module in online standby mode based on the current setting of the user, no card setting is performed.

If the eSIM module is selected as the SIM module in online standby mode based on the current setting of the user, and the eSIM module is currently set as the secondary card, no card setting is performed.

If the eSIM module is selected as the SIM module in online standby mode based on the current setting of the user, and the eSIM module is currently set as the primary card, the mobile phone determines whether the plug-in SIM module is inserted into the SIM module interface 2. If the plug-in SIM module such as the plug-in SIM module 2 is inserted into the SIM module interface 2, the mobile phone may set the plug-in SIM module 2 as the primary card. If no plug-in SIM module is inserted into the SIM module interface 2, the mobile phone may determine whether the plug-in SIM module is inserted into the SIM module interface 1. If the plug-in SIM module such as the plug-in SIM module 1 is inserted into the SIM module interface 1, the mobile phone sets the plug-in SIM module 1 as the primary card.

In addition, if the activated eSIM module deleted by the user is currently set as the primary card, after the user deletes the eSIM module, the mobile phone may further obtain card information (the card information may include a card type and a card identifier) of the eSIM module, and record the obtained card information. After the eSIM module is subsequently reactivated, the mobile phone may set the eSIM module as the primary card based on the recorded card information.

In some other embodiments, an example in which the user changes the plug-in SIM module (such as the plug-in SIM module 1 or the plug-in SIM module 2) from the enabled state to the disabled state is used. After the user changes the plug-in SIM module from the enabled state to the disabled state, the mobile phone may determine that the status of the SIM module in the mobile phone changes. The mobile phone checks the activation status of the eSIM module in the mobile phone, and obtains a status of the plug-in SIM module inserted into the mobile phone, so as to perform card setting based on the activation status of the activated eSIM module in the mobile phone and the status of the plug-in SIM module inserted into the mobile phone.

For example, with reference to FIG. 2, an example in which the user changes the plug-in SIM module 1 from the enabled state to the disabled state is used. After the user changes the plug-in SIM module 1 from the enabled state to the disabled state, the mobile phone may determine that the status of the SIM module in the mobile phone changes.

If the plug-in SIM module 1 is currently set as the secondary card, no card setting is performed.

If the plug-in SIM module 1 is currently set as the primary card, the mobile phone may check the activation status of the eSIM module in the mobile phone, to determine whether the mobile phone activates the eSIM module. If the mobile phone does not activate the eSIM module, the mobile phone may determine whether the plug-in SIM module is inserted into the SIM module interface 2. If the plug-in SIM module such as the plug-in SIM module 2 is inserted into the SIM module interface 2, the mobile phone may set the plug-in SIM module 2 as the primary card. If the mobile phone activates the eSIM module, the mobile phone may determine whether the plug-in SIM module is inserted into the SIM module interface 2. If no plug-in SIM module is inserted into the SIM module interface 2, the mobile phone may set the eSIM module as the primary card. If the plug-in SIM module such as the plug-in SIM module 2 is inserted into the SIM module interface 2, the mobile phone may set a SIM module in online standby mode as the primary card based on a current setting of the user. For example, if the user currently selects the plug-in SIM module 2 to be in online standby mode, the mobile phone sets the plug-in SIM module 2 as the primary card. For another example, if the user currently selects the eSIM module to be in online standby mode, the mobile phone sets the eSIM module as the primary card. For details about how the user selects one of the plug-in SIM module 2 and the eSIM module to be in online standby mode, refer to descriptions of corresponding content in the example shown in FIG. 6(a) and FIG. 6(b).

For another example, with reference to FIG. 2, an example in which the user changes the plug-in SIM module 2 from the enabled state to the disabled state is used. After the user changes the plug-in SIM module 2 from the enabled state to the disabled state, the mobile phone may determine that the status of the SIM module in the mobile phone changes.

If the plug-in SIM module 2 is currently set as the secondary card, no card setting is performed.

If the plug-in SIM module 2 is currently set as the primary card, the mobile phone may check the activation status of the eSIM module in the mobile phone, to determine whether the mobile phone activates the eSIM module. If the mobile phone does not activate the eSIM module, the mobile phone may determine whether the plug-in SIM module is inserted into the SIM module interface 1. If the plug-in SIM module such as the plug-in SIM module 1 is inserted into the SIM module interface 1, the mobile phone sets the plug-in SIM module 1 as the primary card. If the mobile phone activates the eSIM module, the mobile phone sets the eSIM module as the primary card.

In some other embodiments, an example in which the user changes the eSIM module from the enabled state to the disabled state is used. After the user changes the eSIM module from the enabled state to the disabled state, the mobile phone may determine that the status of the SIM module in the mobile phone changes. The mobile phone obtains a status of the plug-in SIM module inserted into the mobile phone, to perform card setting based on the status of the inserted plug-in SIM module.

For example, with reference to FIG. 2, an example in which the user changes the eSIM module from the enabled state to the disabled state is used. After the user changes the eSIM module from the enabled state to the disabled state, the mobile phone may determine that the status of the SIM module in the mobile phone changes.

If the eSIM module is currently set as the secondary card, no card setting is performed.

If the eSIM module is currently set as the primary card, the mobile phone may determine whether the plug-in SIM module is inserted into the SIM module interface 2. If it is determined that the plug-in SIM module such as the plug-in SIM module 2 is inserted into the SIM module interface 2, the mobile phone sets the plug-in SIM module 2 as the primary card. If no plug-in SIM module is inserted into the SIM module interface 2, the mobile phone determines whether the plug-in SIM module is inserted into the SIM module interface 1. If the plug-in SIM module such as the plug-in SIM module 1 is inserted into the SIM module interface 1, the mobile phone sets the plug-in SIM module 1 as the primary card.

It should be noted that "determining that the status of the SIM module in the mobile phone changes" in the foregoing embodiments is an optional step. In other words, the mobile phone may perform card setting when detecting that the SIM module interface changes from the state of not connecting to the plug-in SIM module to the state of connecting to the plug-in SIM module, the SIM module interface changes from the state of connecting to the plug-in SIM module to the state of not connecting to the plug-in SIM module, the plug-in SIM module changes from the enabled state to the disabled state, the eSIM module changes from the enabled state to the disabled state, a new eSIM module is added and activated, or an original activated eSIM module is deleted. Alternatively, when detecting one of the foregoing situations, the mobile phone may determine that the status of the SIM module changes, and then perform card setting. This is not specifically limited in the embodiments.

In some other embodiments of this application, the user may independently select whether the plug-in SIM module 2 is in online standby mode or the eSIM module is in online standby mode. For example, when the plug-in SIM module 2 is currently in online standby mode, the user may switch the eSIM module to be in online standby mode. In addition, the mobile phone may further perform the process shown in FIG. 9A and FIG. 9B in response to a switching operation of the user, to complete card setting.

For example, with continued reference to FIG. 6(a) and FIG. 6(b) and the example thereof, the plug-in SIM module 2 is currently in online standby mode. If the user wants to switch the eSIM module to be in online standby mode, as shown in FIG. 6(b), the user may tap the button 607-2 included in the "type" option 607 on the card 2 settings interface 606.

Figure 9A:
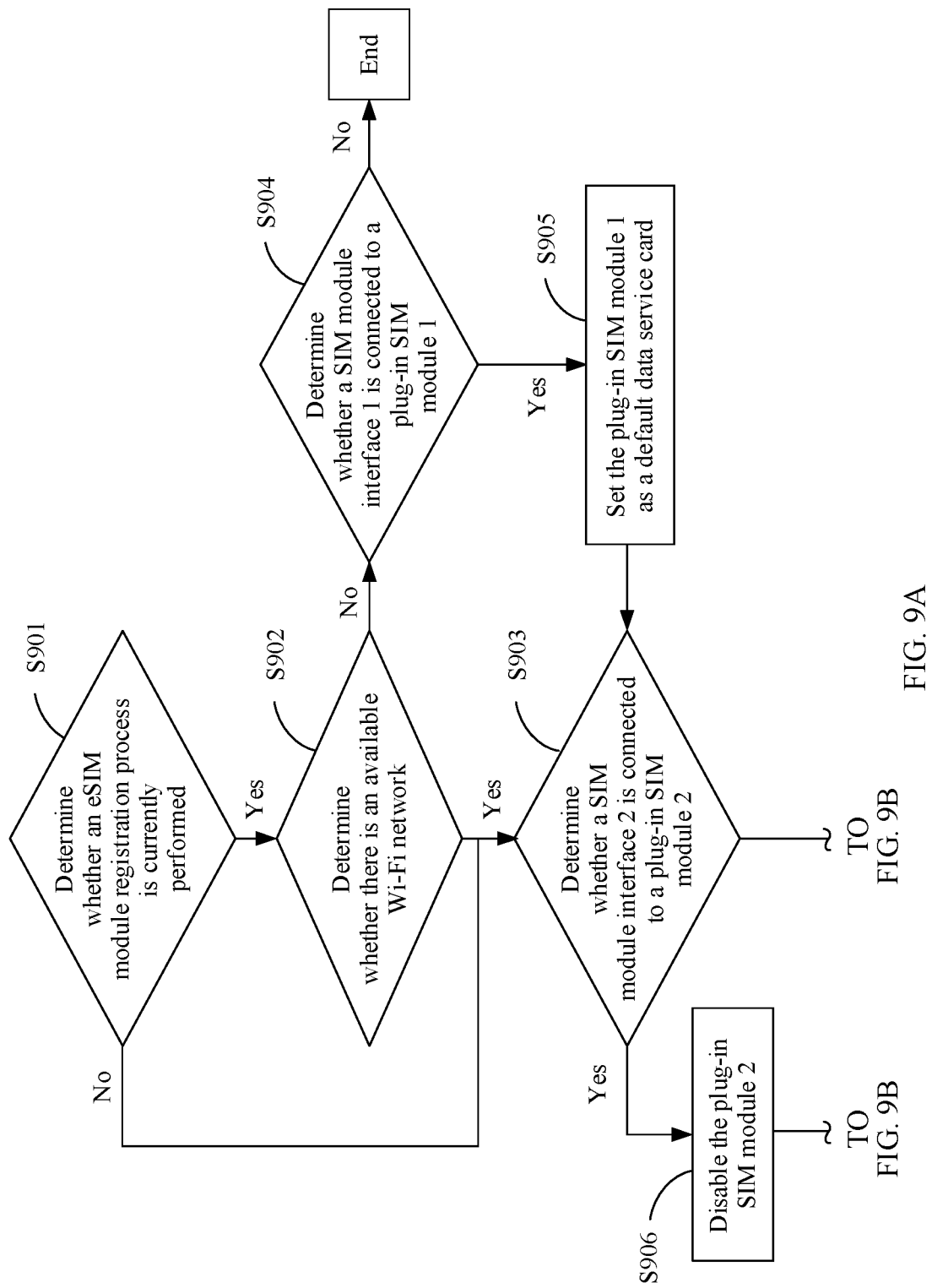
FIG. 9A and FIG. 9B are a schematic flowchart of a SIM module management method according to an embodiment of this application.
Figure 9B:
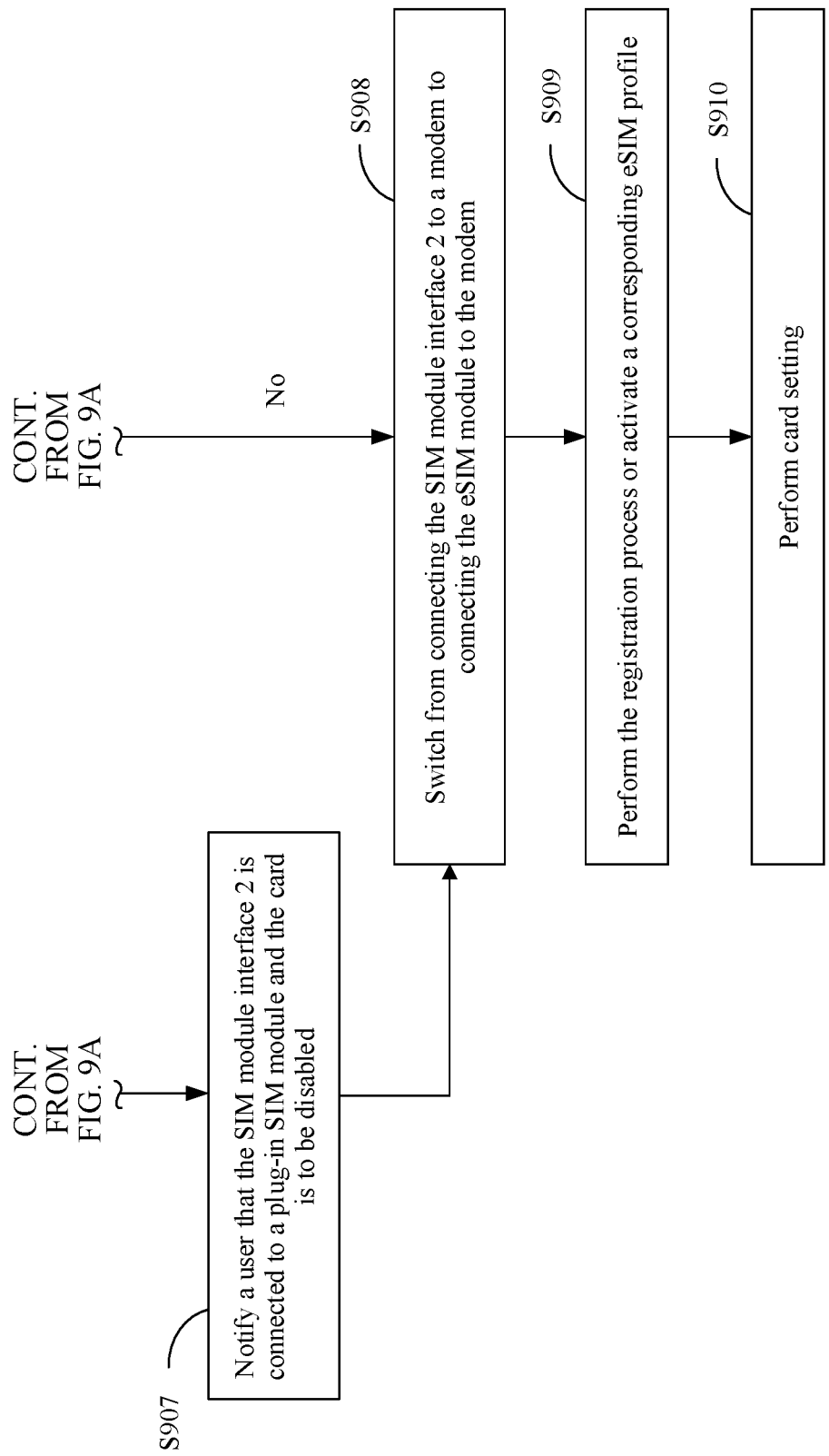

As shown in FIG. 9A and FIG. 9B, in response to the tap operation on the button 607-2, the mobile phone may determine whether an eSIM module registration process is currently performed (that is, perform S901). If the registration process is performed, it is determined whether there is an available Wi-Fi network (that is, perform S902). If there is an available Wi-Fi network, it is determined whether the SIM module interface 2 is connected to the plug-in SIM module (that is, perform S903). For the registration process, refer to a definition of an eSIM in an existing GSMA. For details, refer to descriptions of corresponding content in SGP.22. Details are not described in this application.

If no Wi-Fi network is available, the mobile phone determines whether the SIM module interface 1 is connected to the plug-in SIM module (that is, perform S904). If the SIM module interface 1 is not connected to the plug-in SIM module, the process ends. If the SIM module interface 1 is connected to the plug-in SIM module such as the plug-in SIM module 1, a default data service card may be set as the plug-in SIM module 1 (that is, S905 is performed), and S903 continues to be performed, that is, it is determined whether the SIM module interface 2 is connected to the plug-in SIM module.

If the registration process is not performed, the mobile phone may perform S903, that is, determine whether the SIM module interface 2 is connected to the plug-in SIM module.

If a determining result of S903 is that the SIM module interface 2 is connected to the plug-in SIM module, the mobile phone may disable the plug-in SIM module such as the plug-in SIM module 2 connected to the SIM module interface 2 (that is, perform S906). The mobile phone may further prompt the user that the SIM module interface 2 is connected to the plug-in SIM module, and the card is to be disabled (that is, perform S907). Then, the mobile phone performs S908 to switch from connecting the SIM module interface 2 to the modem to connecting the eSIM module (or the eUICC) to the modem. In some other embodiments, if the determining result of S903 is that the SIM module interface 2 is connected to the plug-in SIM module, the mobile phone may first prompt the user that the SIM module interface 2 is connected to the plug-in SIM module, and the card is to be disabled (that is, perform S907). If receiving an operation that the user confirms to disable the plug-in SIM module 2, the mobile phone performs S906, S908, S909, and S910. If the mobile phone receives an operation that the user cancels disabling the plug-in SIM module 2, the process ends.

If the determining result of S903 is that the SIM module interface 2 is not connected to the plug-in SIM module, S908 may be directly performed. Next, the mobile phone may perform S909 to execute the registration process (this step is performed when a determining result of S901 is the registration process) or activate the corresponding eSIM profile (this step is performed when the determining result of S901 is not the registration process).

Then, the mobile phone may perform card setting (that is, perform S910). This step may specifically include: The mobile phone determines whether a quantity of inserted plug-in SIM modules is 0. If the quantity of inserted plug-in SIM modules is 0, the activated eSIM module is automatically set as the primary card. If the quantity of inserted plug-in SIM modules is 1, and the plug-in SIM module 1 is inserted into the SIM module interface 1, the plug-in SIM module 1 is set as the primary card, and the activated eSIM module is set as the secondary card. If the quantity of inserted plug-in SIM modules is 1, and the plug-in SIM module 2 is inserted into the SIM module interface 2, the plug-in SIM module 2 is automatically deactivated, and the activated eSIM module is set as the primary card. If the quantity of inserted plug-in SIM modules is 2, the mobile phone may display prompt information to remind the user to set a default primary card.

In addition, in response to the tap operation on the button 607-2, the card 2 settings interface 606 may be updated to the card 2 settings interface 701 shown in FIG. 7(*a*). On the card 2 settings interface 701, the button 702-1 of the "type" option 702 is not selected, and the button 702-2 is selected, which is used to indicate that among the plug-in SIM module 2 and the eSIM module, the eSIM module is currently selected to be in online standby mode. If the user wants to re-select the plug-in SIM module 2 to be in online standby mode, the user may tap the button 702-1 of the "type" option 702 on the card 2 settings interface 701. In response to the tap operation on the button 702-1, the mobile phone switches from a state in which the eSIM module is in online standby mode to a state in which the plug-in SIM module 2 is in online standby mode. Certainly, in response to the tap operation of the user on the button 702-1, the card 2 settings interface 701 may be updated to the card 2 settings interface 606 shown in FIG. 6(*b*).

Figure 10B:
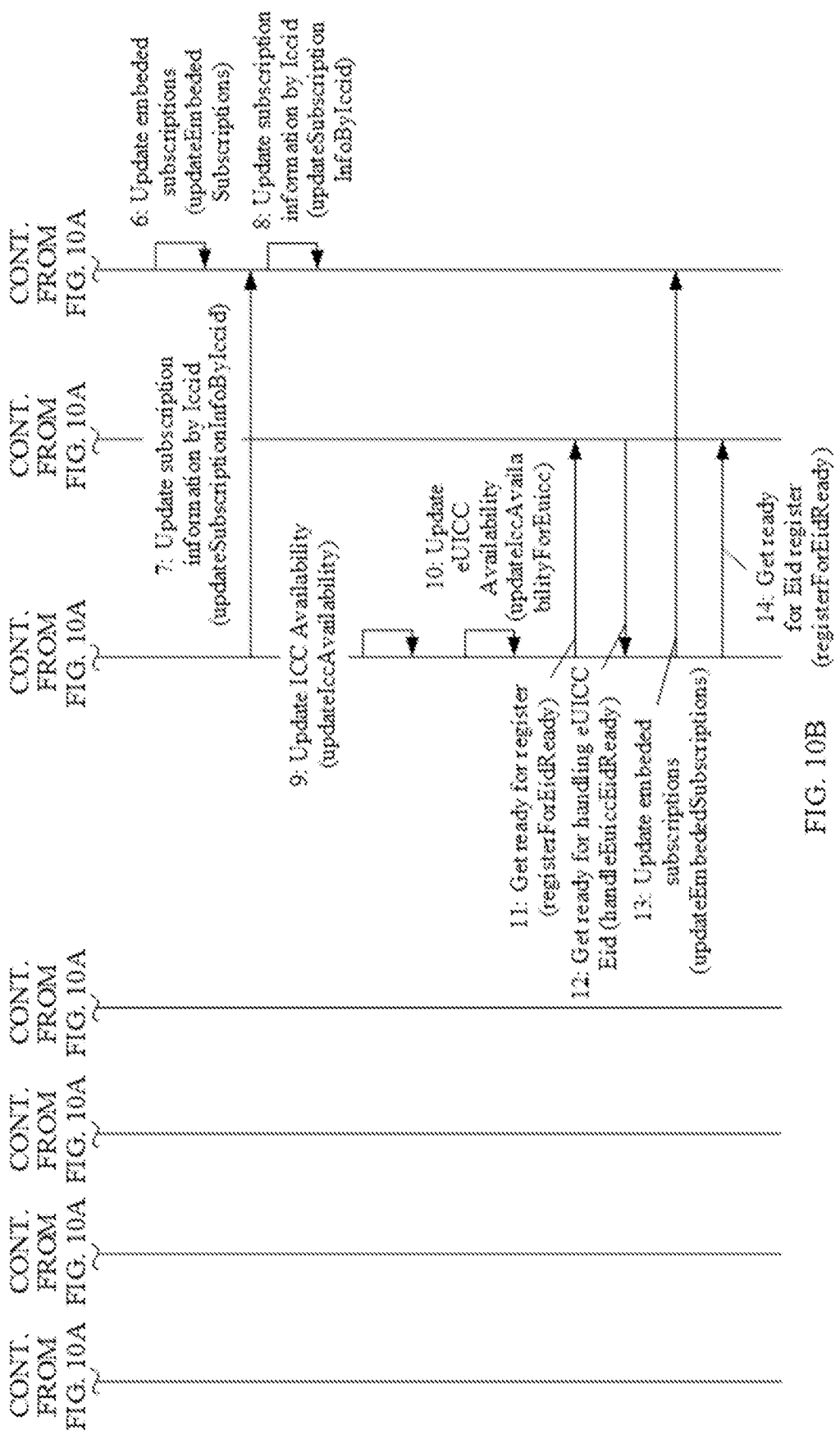

In some other embodiments of this application, a card account of an eSIM module may be updated through the process shown in FIG. 10A and FIG. 10B. Updating the card account may include updating one or more pieces of information such as an ICCID of the eSIM module, a card name, an EID, and activating or deactivating a corresponding eSIM profile. In other words, when the information changes, the card account of the eSIM module may be updated based on a related change.

In FIG. 10A and FIG. 10B, SubscriptionManager, subscriptionController, PhoneFactory, HwSubscriptionInfoUpdaterReference, EuiccCard, and SubscriptionInfoUpdater are all class functions in a telephony service. For example, when an eUICC manager performs an operation such as activating, deactivating, or deleting a corresponding eSIM profile, the card account of the eSIM module may be updated according to steps 1 to 6 in FIG. 10A and FIG. 10B. For example, when the eUICC manager performs the operation such as activating, deactivating, or deleting the corresponding eSIM profile, the eUICC manager delivers a function "requestEmbeddedSubscriptionInfoListRefresh" to the class function SubscriptionInfoUpdater through the class function SubscriptionManager, subscriptionController, PhoneFactory and HwSubscriptionInfoUpdaterReference, to request to update the card account of the eSIM module. That is, perform steps 1 to 4. Then, the class function SubscriptionInfoUpdater invokes a function "updateEmbededSubscriptions" through a function "EVENT_REFRESH_EMBEDDED_SUBSCRIPTIONS", to update the card account of the eSIM module. That is, perform steps 5 and 6.

For another example, in some embodiments, when a user performs an operation of removing or inserting, and enabling or disabling a hard SIM module, the user may update the card account of the eSIM module according to steps 7 and 8 in FIG. 10B. For example, when the user performs the operation of removing or inserting, and enabling or disabling the hard SIM module, the class function HwSubscriptionInfoUpdaterReference invokes the function "updateEmbededSubscriptions" of the class function SubscriptionInfoUpdater through a function "updateSubscriptionInfoByIccid", to update the card account of the eSIM module. That is, perform step 7 and step 8. In some other embodiments, if the user performs the operation of removing or inserting, and enabling or disabling the hard SIM module, the card account of the eSIM module may not be updated.

For another example, currently, the eUICC can process only one command (for example, an EID query command, or an account update command) at a time. If two or more commands need to be processed, command execution fails due to a command conflict. A common scenario is that an EID query command needs to be processed during creation of a EuiccCard object, and if an account update command needs to be processed at the same time, a conflict occurs and the account update command fails to be processed. To resolve this problem, a mobile phone may continuously monitor whether there is an EID query command. When the card account of the eSIM module needs to be updated, if no EID query command is listened to, the account update command is processed, that is, the card account of the eSIM module is updated directly, and monitoring is continuously performed. If the EID query command is listened to, the account update command is processed after a EID query is complete, that is, the card account of the eSIM module is updated. For example, in step 9 to step 14 in FIG. 10B, when the class function HwSubscriptionInfoUpdaterReference detects that an EID query command needs to be processed, that is, "updateIccAvailability" is listened to in step 9, it is further determined that the card account of the eSIM module needs to be updated, that is, "updateIccAvailabilityForEuicc" is listened to in step 10. The class function HwSubscriptionInfoUpdaterReference may first deliver "registerForEidReady" to the class function EuiccCard, to request to monitor the EID. That is, perform step 11. After listening to the EID, the class function EuiccCard may return the queried EID to the class function HwSubscriptionInfoUpdaterReference through a function "handleEuiccEidReady" (that is, perform step 12). Then, the EID query is complete. After the EID query is complete, the class function HwSubscriptionInfoUpdaterReference invokes the function "updateEmbededSubscriptions" to trigger the class function SubscriptionInfoUpdater to update the card account of the eSIM module. That is, perform step 13. Then, the class function HwSubscriptionInfoUpdaterReference may deliver "registerForEidReady" to the class function EuiccCard, to deregister the monitor on the EID query command.

Figure 11:
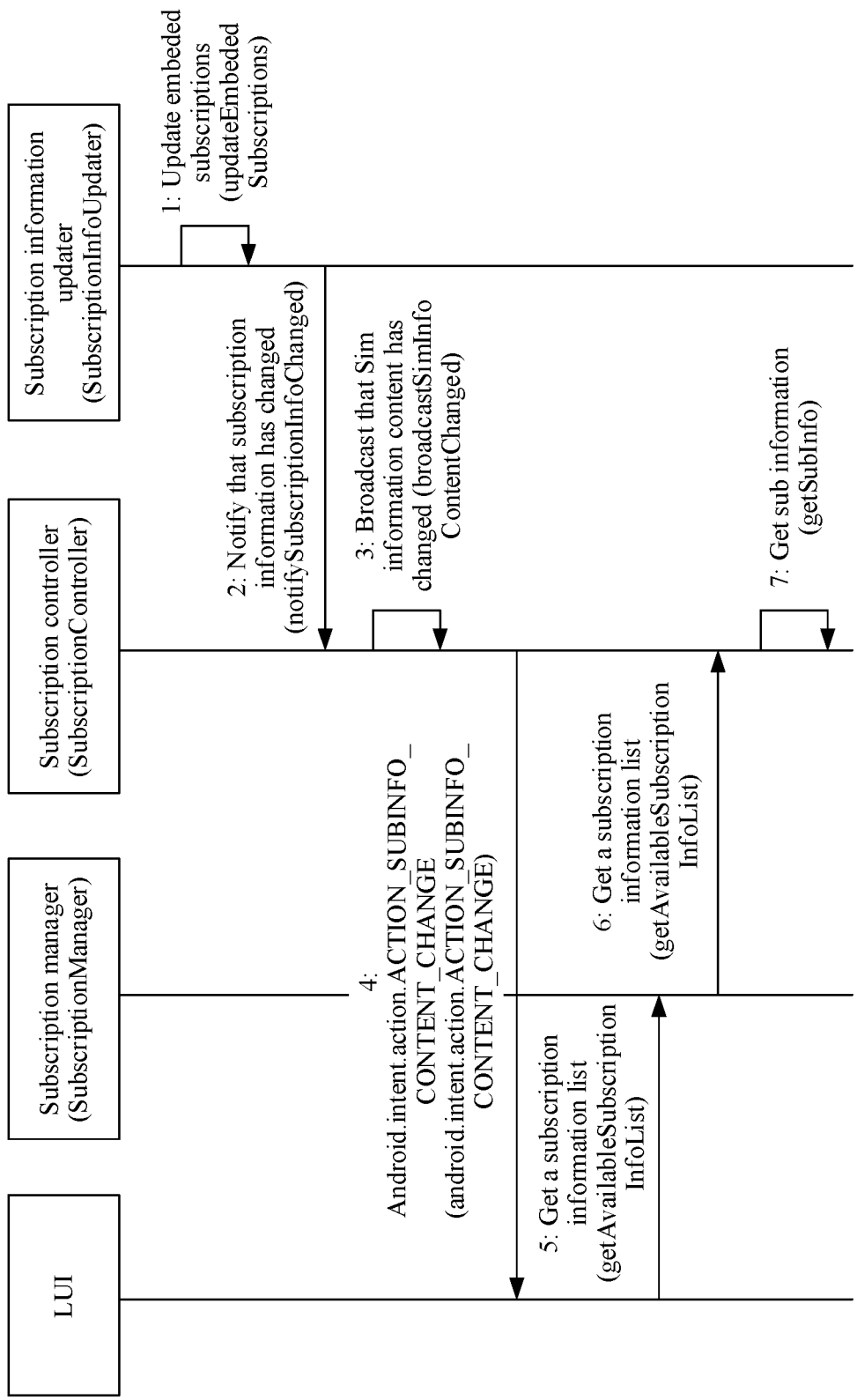
FIG. 11 is a schematic flowchart of querying a card account of an eSIM module according to an embodiment of this application.

In some other embodiments of this application, a card account of an eSIM module may be queried through the process shown in FIG. 11. In FIG. 11, SubscriptionManager, subscriptionController, and SubscriptionInfoUpdater are all class functions in a telephony service. An LUI is an interface of a local profile assistant (local profile assistant, LPA). The LPA may be management software of an eUICC, for example, a card management application. Correspondingly, the LUI may be the SIM module management interface shown in FIG. 6(a) and FIG. 6(b) or FIG. 7(a) to FIG. 7(d). After step 6 in FIG. 10B (that is, step 1 in FIG. 11) is performed, that is, after the class function SubscriptionInfoUpdater invokes the function "updateEmbededSubscriptions" to update the card account of the eSIM module, steps 2 and 3 in FIG. 11 may be performed. That is, the class function SubscriptionInfoUpdater delivers notifySubscriptionInfoChanged to the class function subscriptionController, to notify that the card account of the eSIM module is updated. The class function subscriptionController invokes a function "broadcastSimInfoContentChanged" to broadcast that the card account of the eSIM module is updated. That is, in step 4, "android.intent.action.ACTION_SUBINFO_CONTENT_CHANGE" is sent. After listening to the broadcast, the LUI may perform steps 5 to 7 in FIG. 11 to query the card account of the eSIM module. That is, the LUI sends "getAvailableSubscriptionInfoList" to the class function subscriptionController through the class function SubscriptionManager. The class function subscriptionController invokes a function "getSubInfo" to complete the card account query. After the card account is found, a corresponding interface may be updated based on a query result, for example, content such as a card name in FIG. 7(b) and FIG. 7(c).

Figure 12:
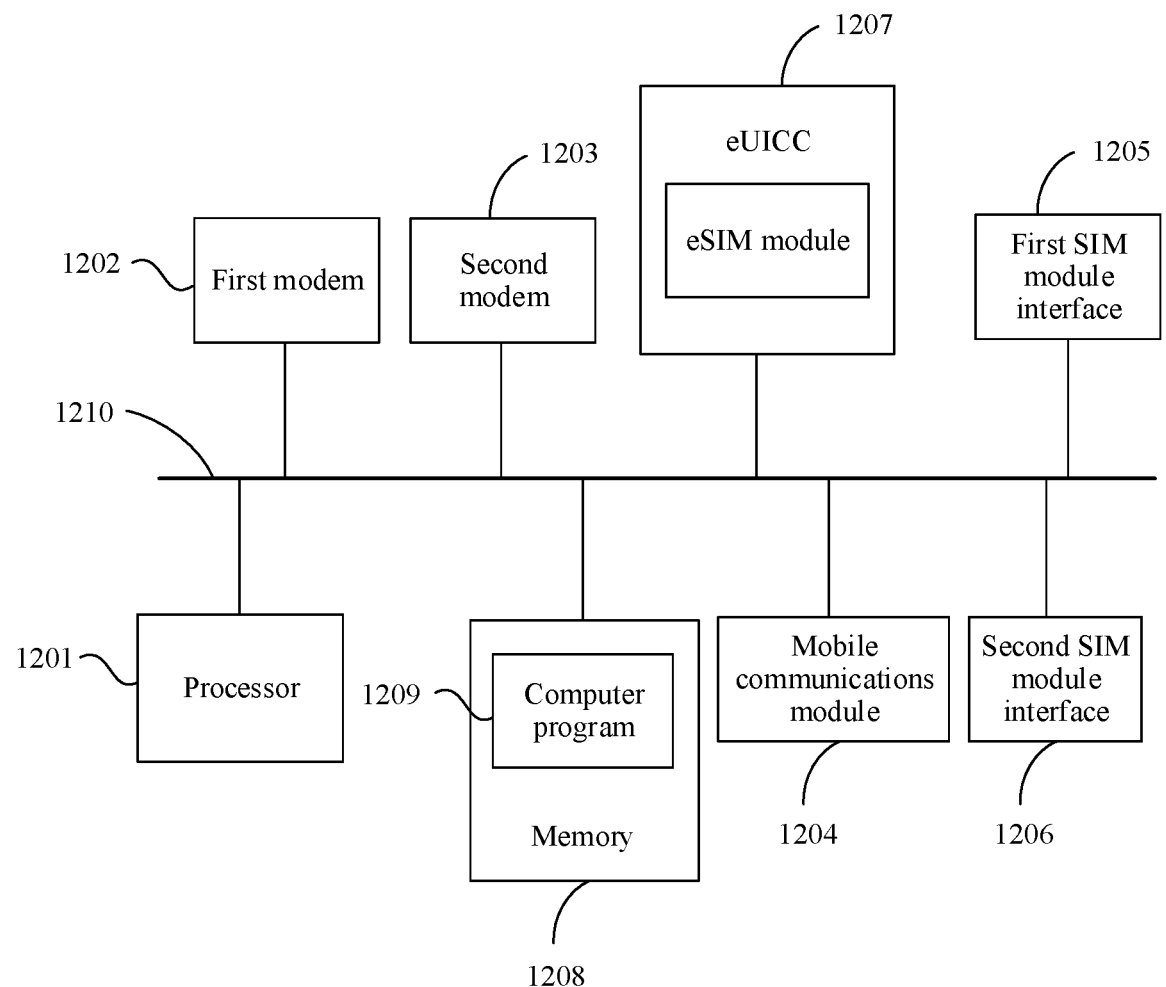
FIG. 12 is a schematic diagram of a structure of an electronic device according to an embodiment of this application.

Some other embodiments of this application further provide an electronic device. As shown in FIG. 12, the electronic device may include a processor 1201, a first modem 1202, a second modem 1203, a mobile communications module 1204, a first SIM module interface 1205, a second SIM module interface 1206, an eUICC 1207, and a memory 1208. The eUICC 1207 is configured to store an eSIM module. The foregoing components may be connected through one or more communications buses 1210. The memory 1208 is configured to store one or more computer programs 1209. The one or more computer programs 1209 are configured to be executed by the processor 1201. The one or more computer programs 1209 include instructions, and the instructions may be used to perform steps performed by the electronic device (such as the mobile phone) in the foregoing embodiments.

The foregoing description about the implementations allows a person skilled in the art to clearly understand that, for the purpose of convenient and brief description, division into the foregoing function modules is merely used as an example for description. During actual application, the foregoing functions can be allocated to different function modules for implementation based on a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising:
   a processor;
   a first modem;
   a second modem;
   a first subscriber identity module (SIM) interface;
   a second SIM interface;
   an embedded universal integrated circuit card (eUICC), the eUICC being configured to store an embedded subscriber identity module (eSIM); and
   a smart card interface (SCI) coupled to at least one of the first modem and the second modem, the SCI including a first end coupled to the processor and a second end coupled to the second SIM interface and the eUICC,
   wherein the processor is coupled to the first modem, the second modem, the first SIM interface, the second SIM interface, and the eUICC,
   and
   wherein the processor is configured to control the SCI to connect one of the second SIM interface and the eUICC to one of the first modem and the second modem, and connect the first SIM interface to the other one of the first modem and the second modem.

2. The electronic device according to claim 1, wherein, in response to a user indicating to add the eSIM to the electronic device, the processor is further configured to:

search profiles of the eSIM through a communication connection while the electronic device displays a first waiting interface;

if a profile of the eSIM is obtained by the searching, notify the user that the profile of the eSIM is obtained by the electronic device; and if no profile of the eSIM is obtained by the searching, provide a function of obtaining the profile of the eSIM through scanning a code, wherein, in response to the user indicating to activate the eSIM, the processor is further configured to activate the eSIM while the electronic device displays a second waiting interface, and wherein, in response to the user indicating to rename the eSIM as shown by the electronic device, the processor is further configured to rename the eSIM based on an input of the user.

3. The electronic device according to claim 1, wherein the processor is further configured to perform card setting in response to detecting at least one of the following situations:
   a first plug-in SIM is inserted into the first SIM interface;
   a second plug-in SIM is inserted into the second SIM interface;
   a connection of the first plug-in SIM to the first SIM interface is removed;
   a connection of the second plug-in SIM to the second SIM interface is removed;
   while the first SIM interface is connected to the first plug-in SIM, the first plug-in SIM changes from an enabled state to a disabled state;
   while the second SIM interface is connected to the second plug-in SIM, the second plug-in SIM changes from an enabled state to a disabled state;
   a first eSIM changes from an enabled state to a disabled state, wherein the first eSIM is activated and stored in the eUICC;
   the first eSIM is deleted; and
   a second eSIM is installed and activated.

4. The electronic device according to claim 3, wherein, in response to detecting that the first plug-in SIM is inserted into the first SIM interface, the processor performing card setting comprises:
   obtaining card information of the first plug-in SIM;
   determining whether the electronic device activates the eSIM; and
   in response to the electronic device not activating the eSIM and only the first plug-in SIM being inserted into the electronic device, setting the first plug-in SIM as a primary card.

5. The electronic device according to claim 4, wherein, in response to the electronic device not activating the eSIM, the first plug-in SIM and the second plug-in SIM being inserted into the electronic device, and the second plug-in SIM being connected to the second SIM interface, the processor performing card setting comprises:
   in response to a determination based on the card information that the first plug-in SIM is previously set by a user as the primary card, setting the first plug-in SIM as the primary card, and setting the second plug-in SIM as a secondary card; or
   in response to a determination based on the card information that the first plug-in SIM is not previously set by the user as the primary card, and the first SIM interface is a primary card slot, setting the first plug-in SIM as the primary card, and setting the second plug-in SIM as the secondary card; or
   in response to a determination that the second SIM interface is the primary card slot, setting the second plug-in SIM as the primary card, and setting the first plug-in SIM as the secondary card.

6. The electronic device according to claim 4, wherein
   in response to the electronic device activating the first eSIM, the processor performing card setting comprises:
   in response to a determination based on the card information that the first plug-in SIM is previously set by the user as the primary card, setting the first plug-in SIM as the primary card, and setting the first eSIM as the secondary card; or
   in response to a determination based on the card information that the first plug-in SIM is not previously set by the user as the primary card, and the first SIM interface is the primary card slot, setting the first plug-in SIM as the primary card, and setting the first eSIM as the secondary card; or
   in response to a determination that the second SIM interface is the primary card slot, setting the first eSIM as the primary card, and setting the first plug-in SIM as the secondary card.

7. The electronic device according to claim 3, wherein, in response to detecting that the second plug-in SIM is inserted into the second SIM interface, the processor performing card setting comprises:
   obtaining card information of the second plug-in SIM; and
   in response to the electronic device not activating the eSIM, and only the second plug-in SIM being inserted into the electronic device, setting the second plug-in SIM as a primary card.

8. The electronic device according to claim 7, wherein
   in response to the electronic device not activating the eSIM, the second plug-in SIM and the first plug-in SIM being inserted into the electronic device, and the first plug-in SIM being connected to the first SIM interface, the processor performing card setting comprises:
   in response to a determination based on the card information that the second plug-in SIM is previously set by a user as the primary card, setting the second plug-in SIM as the primary card, and setting the first plug-in SIM as a secondary card; or
   in response to a determination based on the card information that the second plug-in SIM is not previously set by the user as the primary card, and the second SIM interface is a primary card slot, setting the second plug-in SIM as the primary card, and setting the first plug-in SIM as the secondary card; or
   in response to a determination that the first SIM interface is the primary card slot, setting the first plug-in SIM as the primary card, and setting the second plug-in SIM as the secondary card.

9. The electronic device according to claim 3, wherein, in response to detecting that the connection of the first plug-in SIM to the first SIM interface is removed, or the first plug-in SIM changes from the enabled state to the disabled state, in response to the first plug-in SIM being set as a primary card, the processor performing card setting comprises:
   determining whether the electronic device activates the eSIM; and
   in response to the electronic device not activating the eSIM, and the second SIM interface being connected to the second plug-in SIM, setting the second plug-in SIM as the primary card; or in response to the electronic device activating the first eSIM, and the second SIM interface being not connected to a plug-in SIM, setting the first eSIM as the primary card; or in response to the electronic device activating the first eSIM, and the second SIM interface being connected to the second plug-in SIM, while the eUICC being connected to a modem, setting the first eSIM as the primary card, and while the second SIM interface being connected to the modem, setting the second plug-in SIM as the primary card.

10. The electronic device according to claim 3, wherein, in response to detecting that the connection of the second plug-in SIM to the second SIM interface is removed, or the second plug-in SIM changes from the enabled state to the disabled state, in response to the second plug-in SIM being set as a primary card, the processor performing card setting comprises:

determining whether the electronic device activates the eSIM; and in response to the electronic device not activating the eSIM, and the first SIM interface being connected to the first plug-in SIM, setting the first plug-in SIM as the primary card; or in response to the electronic device activating the first eSIM, setting the first eSIM as the primary card.

11. The electronic device according to claim 3, wherein, in response to detecting that the first eSIM changes from the enabled state to the disabled state, in response to the first eSIM being set as a primary card, the processor performing card setting comprises:

determining whether the second SIM interface is connected to a plug-in SIM; and in response to the second SIM interface being connected to the second plug-in SIM, setting the second plug-in SIM as the primary card; or in response to the second SIM interface being not connected to the second plug-in SIM, and the first SIM interface being connected to the first plug-in SIM, setting the first plug-in SIM as the primary card.

12. The electronic device according to claim 3, wherein, in response to detecting that the second eSIM is installed and activated, the processor performing card setting comprises:

obtaining card information of the second eSIM; and in response to no plug-in SIM being inserted into the first SIM interface, setting the second eSIM as a primary card; or in response to the first plug-in SIM being inserted into the first SIM interface, in response to a determination based on the card information that the second eSIM is previously set by a user as a primary card, setting the second eSIM as the primary card, and setting the first plug-in SIM as a secondary card; or in response to a determination based on the card information that the second eSIM is not previously set by the user as the primary card, and the first SIM interface is a primary card slot, setting the first plug-in SIM as the primary card, and setting the second eSIM as the secondary card, or in response to the second SIM interface being the primary card slot, setting the second eSIM as the primary card, and the first plug-in SIM as the secondary card.

13. The electronic device according to claim 3, wherein, in response to detecting that the first eSIM is deleted, the eUICC is connected to a modem, and the first eSIM is set as a primary card, the processor performing card setting comprises:

determining whether the second SIM interface is connected to a plug-in SIM; and in response to the second SIM interface being connected to the second plug-in SIM, setting the second plug-in SIM as the primary card; or in response to the second SIM interface being not connected to a plug-in SIM, and the first SIM interface being connected to the first plug-in SIM, setting the first plug-in SIM as the primary card.

14. A method for managing a subscriber identify module (SIM), the method comprising:

connecting, by an electronic device, to a network through two SIMs, wherein:

the electronic device comprises a smart card interface (SCI), a first SIM interface, a second SIM interface, an embedded universal integrated circuit card (eUICC) having an embedded subscriber identity module (eSIM) stored thereon, a first modem, and a second modem, the SCI being coupled to at least one of the first modem and the second modem, the SCI including a first end coupled the processor and a second end coupled to the second SIM interface and the eUICC;

the two SIMs comprise a first plug-in SIM connected to the first SIM interface, and a second plug-in SIM connected to the second SIM interface or the eSIM stored onto the eUICC; and the method further comprises controlling the SCI to connect one of the second SIM interface and the eUICC to one of a first modem and a second modem, and connect the first SIM interface to the other one of the first modem and the second modem.

15. The method according to claim 14, wherein, in response to a user indicating to add the eSIM to the electronic device, the method further comprising:

searching, by the electronic device, profiles of the eSIM through a communication connection while the electronic device displays a first waiting interface;

if a profile of the eSIM is obtained by the searching, notifying, by the electronic device, the user that the eSIM is obtained by the electronic device; and if no profile of the eSIM is obtained by the searching, providing, by the electronic device, a function of obtaining the profile of the eSIM through scanning a code, wherein, in response to the user indicating to activate the eSIM, the method further comprising:

activating, by the electronic device, the eSIM while the electronic device displays a second waiting interface, and wherein, in response to the user indicating to rename the eSIM as shown by the electronic device, the method further comprising:

renaming, by the electronic device, the eSIM based on an input of the user.

16. The method according to claim 14, the method further comprising:

performing, by the electronic device, card setting in response to detecting at least one of the following situations:

a first plug-in SIM is inserted into the first SIM interface;

a second plug-in SIM is inserted into the second SIM interface;

a connection of the first plug-in SIM to the first SIM interface is removed;

a connection of the second plug-in SIM connected to the second SIM interface is removed;

while the first SIM interface is connected to the first plug-in SIM, the first plug-in SIM changes from an enabled state to a disabled state;
while the second SIM interface is connected to the second plug-in SIM, the second plug-in SIM changes from an enabled state to a disabled state;
a first eSIM changes from an enabled state to a disabled state, wherein the first eSIM is activated and stored in the eUICC;
the first eSIM is deleted; and
a second eSIM is installed and activated.

17. The method according to claim 16, wherein, in response to detecting that the first plug-in SIM is inserted into the first SIM interface, the performing, by the electronic device, card setting comprises:
obtaining, by the electronic device, card information of the first plug-in SIM;
determining, by the electronic device, whether the electronic device activates the eSIM; and
in response to the electronic device not activating the eSIM, and only the first plug-in SIM being inserted into the electronic device, setting, by the electronic device, the first plug-in SIM as a primary card.

18. The method according to claim 17, wherein,
in response to the electronic device not activating the eSIM, the first plug-in SIM and the second plug-in SIM being inserted into the electronic device, and the second plug-in SIM being connected to the second SIM interface, in response to the electronic device determining, based on the card information, that the first plug-in SIM is previously set by a user as the primary card, setting, by the electronic device, the first plug-in SIM as the primary card, and setting, by the electronic device, the second plug-in SIM as a secondary card; or
in response to the electronic device determining, based on the card information, that the first plug-in SIM is not previously set by the user as the primary card, and the first SIM interface is a primary card slot, setting, by the electronic device, the first plug-in SIM as the primary card, and setting, by the electronic device, the second plug-in SIM as the secondary card; or
in response to the electronic device determining that the second SIM interface is the primary card slot, setting, by the electronic device, the second plug-in SIM as the primary card, and setting, by the electronic device, the first plug-in SIM as the secondary card.

19. The method according to claim 17, wherein,
in response to the electronic device activating the first eSIM, the electronic device determining, based on the card information, that the first plug-in SIM is previously set by the user as the primary card, setting, by the electronic device, the first plug-in SIM as the primary card, and setting, by the electronic device, the first eSIM as the secondary card; or
in response to the electronic device determining, based on the card information, that the first plug-in SIM is not previously set by the user as the primary card, and the first SIM interface is the primary card slot, setting, by the electronic device, the first plug-in SIM as the primary card, and setting, by the electronic device, the first eSIM as the secondary card; or
in response to the electronic device determining that the second SIM interface is the primary card slot, setting, by the electronic device, the first eSIM as the primary card, and setting, by the electronic device, the first plug-in SIM as the secondary card.

20. The method according to claim 17, wherein a SIM set as the primary card is used by the electronic device to transmit mobile data, and a SIM set as a secondary card cannot be used by the electronic device to transmit mobile data.

21. The method according to claim 16, wherein in response to the electronic device detecting that the second plug-in SIM is inserted into the second SIM interface, the performing, by the electronic device, card setting comprises:
obtaining, by the electronic device, card information of the second plug-in SIM; and
in response to the electronic device not activating the eSIM, and only the second plug-in SIM being inserted into the electronic device, setting, by the electronic device, the second plug-in SIM as a primary card.

22. The method according to claim 21, wherein
in response to the electronic device not activating the eSIM, the second plug-in SIM and the first plug-in SIM being inserted into the electronic device, and the first plug-in SIM being connected to the first SIM interface, in response to the electronic device determining, based on the card information, that the second plug-in SIM is previously set by a user as the primary card, setting, by the electronic device, the second plug-in SIM as the primary card, and setting, by the electronic device, the first plug-in SIM as a secondary card; or
in response to the electronic device determining, based on the card information, that the second plug-in SIM is not previously set by the user as the primary card, and the second SIM interface is a primary card slot, setting, by the electronic device, the second plug-in SIM as the primary card, and setting, by the electronic device, the first plug-in SIM as the secondary card; or
in response to the electronic device determining that the first SIM interface is the primary card slot, setting, by the electronic device, the first plug-in SIM as the primary card, and setting, by the electronic device, the second plug-in SIM as the secondary card.

23. The method according to claim 16, wherein, in response to the electronic device detecting that the connection of the first plug-in SIM to the first SIM interface is removed, or the first plug-in SIM changes from the enabled state to the disabled state, in response to the electronic device determining that the first plug-in SIM is set as a primary card, the performing, by the electronic device, card setting comprises:
determining, by the electronic device, whether the electronic device activates the eSIM; and
in response to the electronic device not activating the eSIM, and the second SIM interface being connected to the second plug-in SIM, setting, by the electronic device, the second plug-in SIM as the primary card; or
in response to the electronic device activating the first eSIM, and the second SIM interface being not connected to a plug-in SIM, setting, by the electronic device, the first eSIM as the primary card; or
in response to the electronic device activating the first eSIM, and the second SIM interface being connected to the second plug-in SIM, while the electronic device connecting to the network through the first eSIM in the eUICC, setting, by the electronic device, the first eSIM as the primary card, and while the electronic device connecting to the network through the second plug-in SIM connected to the second SIM interface, setting, by the electronic device, the second plug-in SIM as the primary card.

24. The method according to claim 16, wherein, in response to the electronic device detecting that the connection of the second plug-in SIM to the second SIM interface is removed, or the second plug-in SIM changes from the enabled state to the disabled state, in response to the second plug-in SIM being set as a primary card, the performing, by the electronic device, card setting comprises:
  determining, by the electronic device, whether the electronic device activates the eSIM; and
  in response to the electronic device not activating the eSIM, and the first SIM interface being connected to the first plug-in SIM, setting, by the electronic device, the first plug-in SIM as the primary card; or
  in response to the electronic device activating the first eSIM, setting, by the electronic device, the first eSIM as the primary card.

25. The method according to claim 16, wherein, in response to the electronic device detecting that the first eSIM changes from the enabled state to the disabled state, in response to the first eSIM being set as a primary card, the performing, by the electronic device, card setting comprises:
  determining, by the electronic device, whether the second SIM interface is connected to a plug-in SIM; and
  in response to the second SIM interface being connected to the second plug-in SIM, setting, by the electronic device, the second plug-in SIM as the primary card; or
  in response to the second SIM interface being not connected to the second plug-in SIM, and the first SIM interface being connected to the first plug-in SIM, setting, by the electronic device, the first plug-in SIM as the primary card.

26. The method according to claim 16, wherein, in response to the electronic device detecting that the second eSIM is installed and activated, the performing, by the electronic device, card setting comprises:
  obtaining, by the electronic device, card information of the second eSIM; and
  in response to no plug-in SIM being inserted into the first SIM interface, setting, by the electronic device, the second eSIM as a primary card; or
  in response to the first plug-in SIM being inserted into the first SIM interface, in response to the electronic device determining, based on the card information, that the second eSIM is previously set by a user as a primary card, setting, by the electronic device, the second eSIM as the primary card, and setting, by the electronic device, the first plug-in SIM as a secondary card; or
  in response to the electronic device determining, based on the card information, that the second eSIM is not previously set by the user as the primary card, and the first SIM interface is a primary card slot, setting, by the electronic device, the first plug-in SIM as the primary card, and setting, by the electronic device, the second eSIM as the secondary card, or
  in response to the second SIM interface being the primary card slot, setting, by the electronic device, the second eSIM as the primary card, and the first plug-in SIM as the secondary card.

27. The method according to claim 16, wherein, in response to the electronic device detecting that the first eSIM is deleted, the electronic device connects to the network through the first eSIM in the eUICC, and the first eSIM is set as a primary card, the performing, by the electronic device, card setting comprises:
  determining, by the electronic device, whether the second SIM interface is connected to a plug-in SIM; and
  in response to the second SIM interface being connected to the second plug-in SIM, setting, by the electronic device, the second plug-in SIM as the primary card; or
  in response to the second SIM interface being not connected to a plug-in SIM, and the first SIM interface being connected to the first plug-in SIM, setting, by the electronic device, the first plug-in SIM as the primary card.

28. The method according to claim 14, wherein the connecting, by the electronic device, to the network through the second plug-in SIM connected to the second SIM interface or the eSIM stored in the eUICC comprises:
  displaying, by the electronic device, a first interface, wherein the first interface comprises a first button and a second button;
  receiving, by the electronic device, a selection operation performed by a user on the first button, wherein the first button is selected and the second button is not selected; and in response to the selection operation on the first button, connecting, by the electronic device, to the network through the second plug-in SIM; and
  receiving, by the electronic device, a selection operation performed by the user on the second button, wherein the second button is selected and the first button is not selected; and in response to the selection operation on the second button, connecting, by the electronic device, to the network through the eSIM stored in the eUICC.

29. The method according to claim 16, the method further comprising:
  displaying, by the electronic device, a second interface, wherein the second interface comprises a third button;
  receiving, by the electronic device, an operation performed by a user on the third button; and
  changing, by the electronic device, the first plug-in SIM from the enabled state to the disabled state in response to the operation on the third button.

30. The method according to claim 16, the method further comprising:
  displaying, by the electronic device, a third interface, wherein the third interface comprises a fourth button;
  receiving, by the electronic device, an operation performed by a user on the fourth button; and
  changing, by the electronic device, the second plug-in SIM from the enabled state to the disabled state in response to the operation on the fourth button.

31. The method according to claim 16, wherein the method further comprises:
  displaying, by the electronic device, a fourth interface, wherein the fourth interface comprises a fifth button;
  receiving, by the electronic device, an operation performed by a user on the fifth button; and
  changing, by the electronic device, the first eSIM from the enabled state to the disabled state in response to the operation on the fifth button.

32. A computer-readable storage medium, comprising computer instructions, wherein when the computer instructions are executed by one or more processors, cause the processors to perform:
  connecting an electronic device to a network through two SIMs, wherein:
  the electronic device comprises a smart card interface (SCI), a first SIM interface, a second SIM interface, an embedded universal integrated circuit card (eUICC) having an embedded subscriber identity module (eSIM) stored thereon, a first modem, and a second modem, the SCI being coupled to at least one of the first modem and the second modem, the SCI including a first end coupled the processor and a second end coupled to the second SIM interface and the eUICC;

the two SIMs comprise a first plug-in SIM connected to the first SIM interface, and a second plug-in SIM connected to the second SIM interface or the eSIM stored onto the eUICC; and the computer instructions further cause the processors to control the SCI to connect one of the second SIM interface and the eUICC to one of a first modem and a second modem, and connect the first SIM interface to the other one of the first modem and the second modem.

* * * * *